(12) United States Patent
Kawashima et al.

(10) Patent No.: US 8,367,300 B2
(45) Date of Patent: Feb. 5, 2013

(54) RESIN COMPOSITION FOR LASER ENGRAVING, IMAGE FORMING MATERIAL, RELIEF PRINTING PLATE PRECURSOR FOR LASER ENGRAVING, RELIEF PRINTING PLATE, AND METHOD OF PRODUCING RELIEF PRINTING PLATE

(75) Inventors: Takashi Kawashima, Shizuoka-ken (JP); Atsushi Sugasaki, Shizuoka-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/497,557

(22) Filed: Jul. 3, 2009

(65) Prior Publication Data

US 2010/0015416 A1 Jan. 21, 2010

(30) Foreign Application Priority Data

Jul. 18, 2008 (JP) ................................. 2008-187357
Mar. 12, 2009 (JP) ................................. 2009-059782

(51) Int. Cl.
*G03F 7/00* (2006.01)
*G03F 7/26* (2006.01)

(52) U.S. Cl. ........ 430/306; 430/300; 524/432; 524/399; 524/435; 428/195.1; 264/400; 522/2; 522/90; 522/97; 525/102; 525/100

(58) Field of Classification Search .................. 524/432, 524/399, 435; 428/195.1; 264/400; 522/2, 522/90, 97; 430/306, 300; 525/102, 100
See application file for complete search history.

(56) References Cited

U.S. PATENT DOCUMENTS

| | | | |
|---|---|---|---|
| 5,489,639 A * | 2/1996 | Faber et al. ................. 524/417 |
| 6,001,536 A * | 12/1999 | Vermeersch et al. ......... 430/302 |
| 2003/0089259 A1 * | 5/2003 | Damme et al. ............. 101/463.1 |
| 2003/0124466 A1 * | 7/2003 | Goodin ...................... 430/320 |
| 2003/0180636 A1 | 9/2003 | Kanga |
| 2004/0259034 A1 * | 12/2004 | Schadebrodt et al. ........ 430/300 |
| 2005/0115920 A1 * | 6/2005 | Hiller et al. .................... 216/10 |
| 2006/0260481 A1 * | 11/2006 | Becker et al. ................. 101/170 |
| 2009/0191479 A1 * | 7/2009 | Sugasaki .................... 430/281.1 |
| 2009/0246469 A1 * | 10/2009 | Kawashima et al. .......... 428/156 |

FOREIGN PATENT DOCUMENTS

| | | |
|---|---|---|
| EP | 1080883 A | 3/2001 |
| EP | 2047987 A | 4/2009 |
| EP | 2095970 A | 9/2009 |
| JP | 03-075633 A | 3/1991 |
| JP | 9-171247 A | 6/1997 |
| JP | 2773847 B2 | 7/1998 |
| JP | 2846954 B2 | 1/1999 |
| JP | 11-170718 A | 6/1999 |
| JP | 11-338139 A | 12/1999 |
| JP | 2000-168253 A | 6/2000 |
| JP | 2000-318330 A | 11/2000 |
| JP | 2002-357907 A | 12/2002 |
| WO | 02/16134 A | 2/2002 |

OTHER PUBLICATIONS

Corresponding EPO Official Communication.

* cited by examiner

Primary Examiner — James J. Seidleck
Assistant Examiner — Deve E Valdez
(74) Attorney, Agent, or Firm — SOLARIS Intellectual Property Group, PLLC

(57) ABSTRACT

A resin composition for laser engraving, including: a binder polymer; and a metal compound containing a metal selected from the group consisting of metals in Group 1 to Group 15 in the periodic table.

20 Claims, No Drawings

RESIN COMPOSITION FOR LASER ENGRAVING, IMAGE FORMING MATERIAL, RELIEF PRINTING PLATE PRECURSOR FOR LASER ENGRAVING, RELIEF PRINTING PLATE, AND METHOD OF PRODUCING RELIEF PRINTING PLATE

CROSS-REFERENCE TO RELATED APPLICATION

This application claims priority under 35 USC 119 from Japanese Patent Application No. 2008-187357 filed on Jul. 18, 2008 and Japanese Patent Application No. 2009-059782 filed on Mar. 12, 2009, the disclosures of which are incorporated by reference herein.

BACKGROUND OF THE INVENTION

1. Field of the Invention

The present invention relates to a resin composition for laser engraving, an image forming material, a relief printing plate precursor for laser engraving, a relief printing plate, and a method of producing a relief printing plate.

2. Description of the Related Art

As a method of forming a printing plate by forming concavities and convexities on a photosensitive resin layer laminated on the surface of a support, a method called "analogue plate making" is well known in which a relief forming layer that is formed using a photosensitive composition is exposed to UV-light through an original image film so as to cure selectively image portions, and then uncured portions are removed with a liquid developer.

The relief printing plate is a printing plate with a relief layer having concavities and convexities. Such a relief layer having concavities and convexities is obtained by patterning a relief forming layer containing a photosensitive composition containing as a main component an elastic polymer such as synthetic rubber, a resin such as thermoplastic resin, or a mixture of resin and plasticizer, to form concavities and convexities thereon. Among these relief printing plates, a printing plate having a soft relief layer is referred to as a flexographic printing plate in some cases.

When the relief printing plate is produced by the analogue plate making, an original image film using a silver salt material is usually required, so that cost and time for the production of the original image film are also required. Further, a chemical treatment is required for the development of the original image film, and disposal of the waste liquid of the development process is also needed. Therefore, a still simpler method of producing the printing plate such as, for example, a method using no original image film or a method requiring no development process has been studied.

In recent years, a method of plate making by scanning light exposure of a relief forming layer, in which no original image film is required, has been studied.

As a technique that does not require an original image film, a relief printing plate precursor having a laser sensitive mask layer element that is capable of forming an image mask on a relief forming layer has been proposed (for example, see Japanese Patent No. 2773847 and Japanese Patent Application Laid-Open (JP-A) No. 9-171247). According to these methods of plate making of a plate precursor, an image mask having a function similar to that of an original image film is formed from the mask layer element by laser beam irradiation in accordance with image data, so that the method is called a "Mask CTP method", in which no original image film is needed, but in subsequent processes of plate making, light exposure using UV-light through the image mask is carried out, and uncured portions are removed by development. In view of the fact that a development process is still needed, there is room for improvement.

As a method of producing a printing plate that does not need a development process, there are many proposals about a so-called "direct engraving CTP method" in which a relief forming layer is engraved directly with a laser beam to produce a printing plate. In the direct engraving CTP method, engraving is carried out literally with a laser beam so as to form concavities and convexities that provide relief. The method has an advantage of controlling freely the shape of the relief as opposed to a method of forming relief using an original image film. Owing to this advantage, when an image like a cutout character is formed, the area thereof is engraved deeply as compared with the other areas, or in the case of a fine halftone dot image, engraving so as to form shoulders can be carried out considering the resistance to printing pressure.

However, when a relief having concavities and convexities that are resistant to printing pressure is formed on a relief forming layer that has a predetermined thickness, a high energy is required, and also, the speed of laser engraving is slow. Therefore, a problem of lower productivity as compared with a method of forming an image with a mask is brought about.

For this reason, improvement in the sensitivity of a relief printing plate precursor has been tried. For example, a flexo printing plate precursor for laser engraving that contains an elastomer foam has been proposed (see JP-A No. 2002-357907, for example). In this proposed technology, improvement in the engraving sensitivity is tried by using a low density foam for a relief forming layer. However, the resulting printing plate lacks strength because a low density material is used, thereby bringing about a problem of largely lowering the printing durability.

Further, for example, in Japanese Patent No. 2846954, and JP-A Nos. 11-338139 and 11-170718, a flexo printing plate precursor capable of being engraved with a laser beam or a flexo printing plate obtained by laser engraving is disclosed. In these documents, a flexo printing plate is obtained by mixing a monomer with an elastomer rubber as a binder, curing the resulting mixture by a heat-polymerization mechanism or a photo-polymerization mechanism, and then performing laser engraving.

As a problem of the direct engraving CTP method, slow speed in laser engraving may be mentioned. This is because the engraving depth is required to be at least 100 µm in the direct engraving CTP method in order to directly form relief, as opposed to the mask CTP method in which the thickness of the mask layer element to be ablated is about 1 µm to 10 µm.

For this reason, there are some proposals for improving the laser engraving sensitivity as described below.

For example, a flexo printing plate precursor for laser engraving that contains an elastomer foam has been proposed (for example, see JP-A No. 2000-318330). In this proposed technology, improvement in the engraving sensitivity is tried by using a low density foam. However, the resulting printing plate lacks strength because a low density material is used, thereby bringing about a problem of largely lowering the printing durability.

For example, a flexo printing plate precursor for laser engraving that contains microspheres encapsulating a hydrocarbon gas has been proposed (for example, see U.S. Patent Application Publication No. 2003/180636). In this proposed technology, improvement in the engraving sensitivity is tried by applying a system in which the gas encapsulated in the microspheres is expanded by heat generated with a laser beam and the material to be engraved is collapsed. However, a material containing gas bubbles is used, so that the strength as a printing plate is likely to be insufficient. In addition, since gas has a property of easily expanding by heat as compared with a solid, even if microspheres having a high thermal deformation initiation temperature are selected, changes in volume caused by changes in atmospheric temperature are unavoidable. For this reason, the material containing gas bubbles is not appropriate for a printing plate in which stable accuracy in thickness is required.

For example, a resin relief printing plate precursor for laser engraving that contains a polymer filler having a ceiling temperature lower than 600 K has been proposed (for example, see JP-A No. 2000-168253). In this proposed technology, improvement in the engraving sensitivity is tried by adding a polymer filler having a low depolymerization temperature. However, the polymer filler brings about unevenness on the surface of a resulting printing plate precursor, thereby providing a problem of having a significant influence on the printing quality.

As mentioned above, regarding a resin composition that can be appropriately applied to a relief forming layer of a relief printing plate precursor for laser engraving, various technologies have been proposed, but a technology having a high engraving sensitivity upon laser engraving has not yet been proposed.

SUMMARY OF THE INVENTION

According to an aspect of the invention, there is provided a resin composition for laser engraving, comprising: (A) a binder polymer; and (B) a metal compound containing a metal selected from the group consisting of metals in Group 1 to Group 15 in the periodic table.

DETAILED DESCRIPTION OF THE INVENTION

Hereinafter, the resin composition for laser engraving, the image forming material, the relief printing plate precursor for laser engraving, the relief printing plate, and the method of producing a relief printing plate of the present invention will be described in detail.

Resin Composition for Laser Engraving

The resin composition for laser engraving of the present invention contains (A) a binder polymer and (B) a metal compound containing a metal selected from the group consisting of metals in Group 1 to Group 15 in the periodic table.

Hereinafter, the resin composition for laser engraving of the present invention is also referred to simply as "resin composition of the present invention."

The resin composition of the present invention is high in engraving sensitivity upon being used for laser engraving, thereby enabling high speed laser engraving and also shortening the engraving time. In addition, offensive odor generated upon laser engraving is able to be suppressed. The resin composition of the present invention having these advantages is applicable widely without any particular limitation for use in forming resin articles that are subjected to laser engraving. Exemplary applications of the resin composition according to the present invention may include, specifically, an image forming layer of an image forming material in which an image is formed by laser engraving; a relief forming layer of a printing plate precursor in which a convex relief is formed by laser engraving; an intaglio printing plate; a stencil printing plate; and a stamp, but are not limited to these applications. The resin composition of the present invention is particularly preferably usable for an image forming layer of an image forming material in which an image is formed by laser engraving and a relief forming layer of a relief printing plate precursor for laser engraving.

Hereinafter, constituent elements of the resin composition for laser engraving will be described.

<(A) Binder Polymer>

The resin composition for laser engraving of the present invention contains (A) a binder polymer. The binder polymer is a main component contained in the resin composition for laser engraving, and usually a thermoplastic resin, a thermoplastic elastomer or the like is used in accordance with purposes.

For example, considering the laser engraving sensitivity, a polymer containing a partial structure that thermally decomposes by light exposure or heating is preferable.

Further, for example, when a soft film having flexibility is desired to be formed, a soft resin or a thermoplastic elastomer is selected.

Still further, for example, when the resin composition for laser engraving is used for a relief forming layer of a relief printing plate precursor for laser engraving, considering easiness in the preparation of the composition for a relief forming layer and improvement in the resistance of a resulting relief printing plate to an oil-based ink, a hydrophilic or alcohol-philic polymer is preferably used.

In addition, for example, when used for the purpose of being cured by heating or light exposure for improving the strength, a polymer having a carbon to carbon unsaturated bond in the molecule thereof is selected as the binder polymer.

In this way, considering the properties of the resin composition for laser engraving in accordance with the purposes of applications thereof, a binder polymer that meets the purposes may be selected. The binder polymer may be used solely or in a combination of two or more kinds.

Hereinafter, various kinds of polymers usable as the binder polymer in the present invention will be described.

Decomposable Polymer

Examples of the binder polymer that is preferably used from the viewpoint of the laser engraving sensitivity may include a polymer (decomposable polymer) having a partial structure that receives energy such as light exposure or heating and decomposes.

Examples of the decomposable polymer may include polymers that contain, as a monomer unit having an easily decomposable or breakable partial structure in the molecule thereof, styrene, α-methylstyrene, α-methoxystyrene, acryl esters, methacryl esters, ester compounds other than the foregoing ones, ether compounds, nitro compounds, carbonate compounds, carbamoyl compounds, hemiacetal ester compounds, oxyethylene compounds, aliphatic cyclic compounds, or the like.

Of these, particularly, polyethers such as polyethylene glycol, polypropylene glycol, or polytetraethylene glycol; aliphatic polycarbonates; aliphatic carbamates; polymethyl methacrylate; polystyrene; nitrocellulose; polyoxyethylene; polynorbornene; hydrogenated polycyclohexadiene; and a polymer having a molecular structure such as a dendrimer that is rich in branched structure may be preferably included, from the viewpoint of decomposability.

Further, a polymer having a number of oxygen atoms in the molecular chain thereof is preferable, from the viewpoint of decomposability. From this viewpoint, a compound having a carbonate group, a carbamate group, or a methacryl group in the polymer main chain thereof may be preferably included.

Examples of a polymer having an appropriate thermal decomposability may include polyester or polyurethane that is synthesized by using (poly)carbonate diol or (poly)carbonate dicarboxylic acid as a raw material and polyamide that is synthesized by using (poly)carbonate diamine as a raw material. These polymers may have a polymerizable unsaturated group in the main or side chain thereof. In particular, when a reactive functional group such as hydroxyl group, amino group or carboxyl group is involved, a polymerizable unsaturated group is easily incorporated into the thermally decomposable polymers.

Furthermore, as the decomposable polymer, a polyester such as polylactic acid that includes a hydroxylcarboxylic acid unit is usable. Specifically, the polyester is selected preferably from the group consisting of polyhydroxyalkanoate (PHA), a lactic acid polymer, polyglycolic acid (PGA), polycaprolactone (PCL), poly(butylene succinic acid), and their derivatives or mixtures.

Thermoplastic Polymer

As one of the binder polymers preferably used from the viewpoint of the laser engraving sensitivity, a thermoplastic polymer may be used.

The thermoplastic polymer may be an elastomer or non-elastomer resin and may be selected in accordance with the purposes of the resin composition for laser engraving of the present invention.

Examples of the thermoplastic elastomer may include an urethane thermoplastic elastomer, an ester thermoplastic elastomer, an amide thermoplastic elastomer, and a silicone thermoplastic elastomer. For the purpose of improving the laser engraving sensitivity of these thermoplastic elastomers, an elastomer that is obtained by incorporating an easily decomposing functional group such as carbamoyl group or carbonate group into the main chain of the elastomer may be used. A mixture of the thermoplastic polymer and the thermal decomposable polymer may be used.

The thermoplastic elastomer exhibits a rubber elasticity at normal temperature and has a molecular structure composed of a soft segment such as polyether or rubber molecules and a hard segment that prevents plastic deformation at around normal temperature similarly to vulcanized rubber. Examples of the hard segment include various types such as a frozen phase, a crystalline phase, hydrogen bond, or ionic crosslinking. The thermoplastic elastomer is preferable when the resin composition for laser engraving of the present invention is applied to the production of a relief printing plate such as a flexo printing plate that requires flexibility.

The kind of the thermoplastic elastomer is selected in accordance with purposes. When solvent resistance is required, a urethane, ester, amide, or fluoro thermoplastic elastomer is preferable, for example. When heat resistance is required, a urethane, olefin, ester, or fluoro thermoplastic elastomer is preferable. By selecting the kind of the thermoplastic elastomer, the hardness of a film formed from the resin composition may be varied considerably.

Examples of the non-elastic resin may include polyester resin, unsaturated polyester resin, polyamide resin, polyamideimide resin, polyurethane resin, unsaturated polyurethane resin, polysulfone resin, polyethersulfone resin, polyimide resin, polycarbonate resin, wholly aromatic polyester resin, and a hydrophilic polymer having a hydroxyethylene unit (for example, polyvinylalchol derivatives).

Hydrophilic or Alcoholphilic Polymer

As the binder polymer used in the present invention, a hydrophilic or alcoholphilic one is preferable from the viewpoint of removing engraving scraps. Examples of the hydrophilic polymer may include specifically the ones described below, but among these, a hydrophilic polymer having a hydroxyethylene unit is preferable. In addition, as the hydrophilic or alcoholphilic binder, a polymer such as polyvinylbutyral is preferably used, for example.

The hydrophilic polymer that is one of the preferable examples of the binder polymer is described in detail.

The hydrophilic polymer means a water-soluble or water-swellable polymer. Here, in the present invention, "water-soluble" means that the polymer is dissolved in water at 25° C. in an amount of 5% or more by mass, and "water-swellable" means that the polymer absorbs water and expands when it is added to 25° C. water in an amount of 5% by mass and that the polymer is recognized not to be dissolved in water by visual observation but no apparent solid (powdery) precipitation is observed.

As the hydrophilic polymer, a single kind of polymer may be used or plural kinds of polymers may be used.

Examples of the hydrophilic polymer may include a hydrophilic polymer having a hydroxyethylene unit; polysaccharides such as cellulose having a hydrophilic functional group; an acrylic resin that has a salt structure like sodium polyacrylate obtained by neutralizing an acidic functional group, a salt structure obtained by neutralizing an amino group, or an onium structure; polyamide resin or polyester resin in which a hydrophilic group such as polyethyleneoxide is incorporated; and gelatin.

As the hydrophilic polymer, from the viewpoint of exhibiting adequate hydrophilicity, a hydrophilic polymer having a hydroxyethylene group; cellulose that has a polar group such as an amino group, a carboxylic acid group, a sulfonic acid group, a sulfuric acid group, or a salt structure obtained by neutralizing these groups; an acrylic resin that has a polar group such as an amino group, a carboxylic acid group, a sulfonic acid group, a sulfuric acid group, or a salt structure that is obtained by neutralizing these groups; and polyamide resin are preferable. A hydrophilic polymer having a hydroxyethylene; an acrylic resin that has a polar group such as an amino group, a carboxylic acid group, a sulfonic acid group, a sulfuric acid group, or a salt structure obtained by neutralizing these groups; and polyamide resin are more preferable. Polyvinylalcohols and polyamide resin are still more preferable.

As the hydrophilic polymer, from the viewpoint of having film forming property and UV-ink resistance, a polymer selected from polyvinylalcohol (PVA) and the derivatives thereof is particularly preferable.

The PVA and PVA derivatives will be described in detail as a preferable example of a vinyl polymer described later.

In the present invention, the PVA and PVA derivatives may include a copolymer or polymer that contains a hydroxyethylene unit in an amount of from 0.1 mol % to 100 mol %, preferably from 1 mol % to 98 mol %, and still more preferably from 5 mol % to 95 mol %, and a modified product thereof.

As the hydrophilic polymer, particularly, at least one selected from the PVA and the derivatives thereof and a hydrophilic polymer having no hydroxyethylene unit (hereinafter, also referred to as "non-PVA derivative" appropriately) may be used in combination.

As a method of synthesizing hydrophilic polyamide, the following method may be used.

ε-Caprolactam and/or adipic acid are reacted with a polyethylene glycol having both ends modified with amine to obtain a polyamide having polyethylene glycol unit, which is then reacted with piperazine to obtain a hydrophilic polyamide having a piperazine framework. Further, a hydrophilic polyamide having a crosslinkable functional group incorporated in the polymer may be obtained by reacting the amide group of the hydrophilic polyamide and the epoxy group of glycidylmethacrylate. These non-PVA derivatives may be used solely or as a mixture of two or more kinds.

The non-PVA derivatives mean the ones that have a polarity close to PVA and the derivatives thereof to such an extent that they exhibit compatibility with PVA and the derivatives thereof.

Specific examples of the non-PVA derivatives may include a hydrophilic polyamide that is obtained by incorporating a hydrophilic group such as polyethylene glycol or piperazine into a water insoluble polyamide obtained by polymerizing adipic acid, 1,6-hexanediamine, or ε-caprolactam. The hydrophilic polyamide exhibits compatibility with the PVA derivatives by an action of the hydrophilic group thereof, so that the hydrophilic polyamide is suitably used as a non-PVA derivative. That is, the hydrophilic polyamide has an adequate compatibility with the PVA and the derivatives thereof and easily enters between the molecules of the PVA and the derivatives thereof, thereby lowering the intermolecular force between these two kinds of polymers and softening the polymer.

Hydrophobic Polymer

As the binder polymer in the present invention, a relatively hydrophobic binder polymer may be also used.

As the relatively hydrophobic polymer, for the purpose of conditioning film hardness or flexibility upon film forming and properties such as compatibility with the other components such as coexisting polymerizable compounds or initiators, a polymer that contains, as a polymerizable or copolymerizable component, the following monomers may be used.

A compound having one ethylenic unsaturated bond, such as: a (meth)acrylate having a hydroxyl group such as 2-hydroxyethyl (meth)acrylate, 2-hydroxypropyl (meth)acrylate, 2-hydroxybutyl (meth)acrylate, 3-chloro-2-hydroxypropyl (meth)acrylate, or β-hydroxy-β'-(meth)acryloyloxyethyl phthalate; an alkyl(meth)acrylate such as methyl(meth)acrylate, ethyl(meth)acrylate, propyl(meth)acrylate, butyl (meth)acrylate, isoamyl(meth)acrylate, 2-ethylhexyl(meth)acrylate, lauryl(meth)acrylate, or stearyl(meth)acrylate; a cycloalkyl(meth)acrylate such as cyclohexyl(meth)acrylate; a halogenated alkyl(meth)acrylate such as chloroethyl(meth)acrylate or chloropropyl (meth)acrylate; an alkoxyalkyl (meth)acrylate such as methoxyethyl(meth)acrylate, ethoxyethyl(meth)acrylate, or butoxyethyl(meth)acrylate; a phoenoxyalkyl(meth)acrylate such as phenoxyethyl(meth)acrylate or nonylphenoxyethyl(meth)acrylate; an alkoxyalkylene glycol(meth)acrylate such as ethoxydiethylene glycol(meth)acrylate, methoxytriethylene glycol(meth)acrylate, or methoxydipropylene glycol(meth)acrylate; (meth)acrylamides such as (meth)acrylamide, diacetone (meth)acrylamide, or N,N'-methylene bis(meth)acrylamide; 2,2-dimethylaminoethyl(meth)acrylate; 2,2-diethylaminoethyl(meth)acrylate; N,N-dimethylaminoethyl(meth)acrylamide; and N,N-dimethylaminopropyl(meth)acrylamide.

A compound having two or more ethylenic unsaturated bonds, such as: a di(meth)acrylate of polyethylene glycol such as diethylene glycol di(meth)acrylate; a polypropylene glycol di(meth)acrylate such as dipropylene glycol di(meth)acrylate; trimethylolpropane tri(meth)acrylate; pentaerythritol tri(meth)acrylate; pentaerythritol tetra(meth)acrylate; glycerol tri(meth)acrylate; a polyfunctional (meth)acrylate that is obtained by addition reaction between ethylene glycol diglycidylether and a compound having an ethylenic unsaturated bond and an active hydrogen such as unsaturated carboxylic acid or unsaturated alcohol; a polyfunctional (meth)acrylate that is obtained by addition reaction between an unsaturated epoxy compound such as glycidyl (meth)acrylate and a compound having an active hydrogen such as carboxylic acid or amine; a polyfunctional (meth)acrylamide such as methylene bis(meth)acrylamide; and a polyfunctional vinyl compound such as divinylbenzene.

In the present invention, these may be used solely or in a combination of two or more kinds thereof.

As the monomer serving as the polymerizable component, from the viewpoint of film forming property, an alkoxyalkylene glycol(meth)acrylate such as 2-hydroxyethyl (meth)acrylate, 2-hydroxypropyl(meth)acrylate, 2-hydroxybutyl (meth)acrylate, ethoxydiethylene glycol(meth)acrylate, methoxytriethylene glycol(meth)acrylate, or methoxydipropylene glycol(meth)acrylate; (meth)acrylamide; diacetone (meth)acrylamide; cyclohexyl(meth)acrylate; benzyl(meth)acrylate; and N-acryloylmorpholine are preferable. Of these, acrylates are particularly preferable from the viewpoint of securing flexibility of resulting polymers.

Besides the above, as the binder polymer, the following polymer may be used. Namely, a polymer having at least an olefin or a carbon to carbon triple bond in the main chain thereof may be used, and for example, SB (polystyrene-polybutadiene), SBS (polystyrene-polybutadiene-polystyrene), SIS (polystyrene-polyisoprene-polystyrene), and SEBS (polystyrene-polyethylene-polybutylene-polystyrene) may be used.

Polymer Having Carbon to Carbon Unsaturated Bond As the binder polymer, a polymer having a carbon to carbon unsaturated bond in the molecule thereof may be preferably used. The carbon to carbon unsaturated bond may be incorporated in the main chain and/or side chain of the polymer. Hereinafter, the carbon to carbon unsaturated bond is referred to as simply "unsaturated bond" in some cases. Further, the carbon to carbon unsaturated bond at the end of the main chain or side chain is referred to as "polymerizable group" in some cases.

When a carbon to carbon unsaturated bond is incorporated in the main chain of the polymer, it may be incorporated at one end or both ends or in the main chain of the polymer main chain. Further, when a carbon to carbon unsaturated bond is incorporated in the side chain of the polymer, it may be linked to the main chain structure directly or through an appropriate linking group.

Examples of the polymer having a carbon to carbon unsaturated bond in the main chain thereof may include SB (polystyrene-polybutadiene), SBS (polystyrene-polybutadiene-polystyrene), SIS (polystyrene-polyisoprene-polystyrene), and SEBS (polystyrene-polyethylene-polybutylene-polystyrene).

When a polymer having a highly reactive polymerizable unsaturated group such as methacryloyl group is used as the polymer having a carbon to carbon unsaturated bond in the side chain thereof, a film having an extremely high mechanical strength may be prepared. Particularly in a polyurethane or polyester thermoplastic elastomer, a highly reactive polymerizable unsaturated group may be incorporated easily in the molecule thereof.

In order to introduce an unsaturated bond or a polymerizable group into the binder polymer, any known method may be selected, including a method in which a structural unit having a polymerizable group precursor obtained by linking a protective group to a polymerizable group is copolymerized in a polymer; and then the protective group is eliminated to restore the polymerizable group, and a method in which a polymer compound having plural reactive groups such as hydroxyl, amino, epoxy, carboxyl, acid anhydride, ketone, hydrazine, isocyanate, isothiocyanate, cyclic carbonate, or ester group is prepared; after that, a linking agent (for example, polyisocyanate in the case of hydroxyl group or amino group) having plural groups capable of linking to the above reactive groups is reacted with the polymer compound; and then, after the molecular weight is conditioned and the terminal groups are transformed into terminal linking groups, the polymer compound is reacted through a polymer reaction with an organic compound that has a polymerizable unsaturated group and a group having a capability of reacting with the terminal linking groups so as to introduce a polymerizable group. In accordance with these methods, the amount of the unsaturated bond and the polymerizable group introduced into the polymer compound may be regulated.

The polymer having an unsaturated bond may be preferably used in combination with a polymer having no unsaturated bond. Namely, a polymer that is obtained by adding hydrogen to an olefin portion of the polymer having a carbon-carbon unsaturated bond or a polymer that is obtained from a monomer having a hydrogenated olefin portion, for example, a monomer obtained by hydrogenating butadiene, isoprene or the like, may be used in combination because these polymers have an adequate compatibility. Thereby, the amount of the unsaturated bond that the binder polymer possesses may be controlled.

When these are used in combination, the polymer having no unsaturated bond may be used in an amount of usually from 1 part to 90 parts by mass and preferably from 5 parts to 80 parts by mass with respect to 100 parts by mass of the polymer having an unsaturated bond.

Note that, as described later, in an embodiment in which the binder polymer is not required to be curable, including a case where the other polymerizable compounds are used in combination, an unsaturated bond is not necessarily essential for the binder polymer. Various kinds of polymers that have no unsaturated bond may be used as the binder polymer. Preferable examples of the polymer having no unsaturated bond may include polyester, polyamide, polystyrene, acrylic resin, acetal resin, and polycarbonate.

The number average molecular weight of the binder polymer that has or does not has an unsaturated bond is in the range of preferably from 1,000 to 1,000,000 and more preferably from 5,000 to 500,000. When the number average molecular weight is in the range of from 1,000 to 1,000,000, the mechanical strength of resulting films may be secured. The number average molecular weight described herein is measured by gel permeation chromatography (GPC) using a polystyrene having a known molecular weight as a standard sample.

As the binder polymer in the present invention, among the various kinds of binder polymers as described above, a polymer selected from the group consisting of vinyl polymers, polyamide, polyurethane, and polyurea is preferably used from the viewpoint of improving engraving sensitivity.

Hereinafter, these preferable binder polymers are described.

Vinyl Polymers

The vinyl polymers according to the present invention are preferably polymers or copolymers obtained from the following vinyl monomers including acrylic acid esters, methacrylic acid esters, vinylesters, acrylamides, methacrylamides, olefins, styrenes, crotonic acid esters, itaconic acid diesters, maleic acid diesters, and fumaric acid diesters, but the present invention is in no way limited by these polymers or copolymers.

Examples of the acrylic acid esters may include: methyl acrylate, ethyl acrylate, n-propyl acrylate, isopropyl acrylate, n-butyl acrylate, tert-butyl acrylate, isobutyl acrylate, sec-butyl acrylate, amyl acrylate, hexyl acrylate, 2-ethylhexyl acrylate, octyl acrylate, tert-octyl acrylate, 2-chloroethyl acrylate, 2-bromoethyl acrylate, 4-chlorobutyl acrylate, cyanoethyl acrylate, 2-acetoxyethyl acrylate, dimethylaminoethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-iso-propoxyethyl acrylate, 2-butoxyethyl acrylate, 2-(2-methoxyethoxy)ethyl acrylate, 2-(2-butoxyethoxy)ethyl acrylate, ω-methoxypolyethylene glycol acrylate (addition mole number n is 9), 1-bromo-2-methoxyethyl acrylate, and 1,1-dichloro-2-ethoxyethyl acrylate.

Examples of the methacrylic acid esters may include: methyl methacrylate, ethyl methacrylate, n-propyl methacrylate, isopropyl methacrylate, n-butyl methacrylate, tert-butyl methacrylate, isobutyl methacrylate, sec-butyl methacrylate, amyl methacrylate, hexyl methacrylate, cyclohexyl methacrylate, benzyl methacrylate, chlorobenzyl methacrylate, octyl methacrylate, sulfopropyl methacrylate, N-ethyl-N-phenylaminoethyl methacrylate, 2-(3-phenylpropyloxy) ethyl methacrylate, dimethylaminophenoxyethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-acetoxyethyl methacrylate, 2-acetoacetoxyethyl methacrylate, 2-ethoxyethyl methacrylate, 2-iso-propoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy) ethyl methacrylate, and ω-methoxypolyethylene glycol methacrylate (addition mole number n is 6).

Examples of the vinylesters may include: vinyl acetate, vinyl propionate, vinyl butylate, vinyl isobutylate, vinyl caproate, vinylchloro acetate, vinylmethoxy acetate, vinylphenyl acetate, vinyl benzoate, and vinyl salicylate.

Examples of the acrylamides may include: acrylamide, methyl acrylamide, ethyl acrylamide, propyl acrylamide, butyl acrylamide, tert-butyl acrylamide, cyclohexyl acrylamide, benzyl acrylamide, hydroxymethyl acrylamide, methoxyethyl acrylamide, dimethylaminoethyl acrylamide, phenyl acrylamide, dimethyl acrylamide, diethyl acrylamide, β-cyanoethylacrylamide, N-(2-acetoacetoxyethyl)acrylamide, and diacetone acrylamide.

Examples of the methacrylamides may include: methacrylamide, methyl methacrylamide, ethyl methacrylamide, propyl methacrylamide, butyl methacrylamide, tert-butyl methacrylamide, cyclohexyl methacrylamide, benzyl methacrylamide, hydroxymethyl methacrylamide, methoxyethyl methacrylamide, dimethylaminoethyl methacrylamide, phenyl methacrylamide, dimethyl methacrylamide, diethyl methacrylamide, β-cyanoethyl methacrylamide, and N-(2-acetoacetoxyethyl) methacrylamide.

Examples of the olefins may include: dicyclopentadiene, ethylene, propylene, 1-butene, 1-pentene, vinyl chloride, vinylidene chloride, isoprene, chloroprene, butadiene, and 2,3-dimethyl butadiene.

Examples of the styrenes may include: styrene, methylstyrene, dimethylstyrene, trimethylstyrene, ethylstyrene, isopropylstyrene, chloromethylstyrene, methoxystyrene, chlorostyrene, dichlorostyrene, bromostyrene, and vinylbenzoic acid methylester.

Examples of the crotonic acid esters may include: butyl crotonate and hexyl crotonate.

Examples of the itaconic acid diesters may include: dimethyl itaconate, diethyl itaconate, and dibutyl itaconate.

Examples of the maleic acid diesters may include: diethyl maleate, dimethyl maleate, and dibutyl maleate.

Examples of the fumaric acid diesters may include: diethyl fumarate, dimethyl fumarate, and dibutyl fumarate.

Examples of the other monomers that are used for preparation of the vinyl polymer may include the following monomers:

allyl compounds such as allyl acetate, allyl caproate, allyl laurate, or allyl benzoate;

vinyl ethers such as methylvinyl ether, butylvinyl ether, hexylvinyl ether, methoxyethylvinyl ether, or dimethylaminoethylvinyl ether;

vinyl ketones such as methylvinyl ketone, phenylvinyl ketone, or methoxyethylvinyl ketone;

vinyl heterocyclic compounds such as vinylpyridine, N-vinylimidazole, N-vinyloxazolidone, N-vinyltriazole, or N-vinylpyrrolidone;

glycidyl esters such as glycidyl acrylate or glycidyl methacrylate; and unsaturated nitriles such as acrylonitrile or methacrylonitrile.

The vinyl polymers used in the present invention may be a homo-polymer of the monomers described above or, if necessarily, a copolymer obtained from two or more kinds of the monomers.

As the binder polymer in the present invention, among the vinyl polymers, a vinyl polymer that is soluble in water and/or ethanol is preferable.

In the present invention, "a polymer that is soluble in water and/or ethanol" means that precipitates of polymers are not found and the solution (dispersion liquid) is transparent and uniform when the solubility of the polymer is observed in a manner described below.

Namely, 0.1 g of a binder polymer in a powder or pellet form and 2 mL of water or 2 mL of ethanol are mixed; the mixture is covered with a lid and allowed to stand at room temperature for 24 hours; and the solubility of the binder polymer is evaluated by visual observation.

As the vinyl polymer that is soluble in water and/or ethanol, a polyvinyl alcohol (PVA) derivative is preferable. The PVA derivative in the present invention means a copolymer or polymer that contains a hydroxyethylene unit in an amount of from 0.1 mol % to 100 mol %, preferably from 1 mol % to 98 mol %, and more preferably from 5 mol % to 95 mol %, or a modified product thereof. Therefore, polyvinyl alcohol itself is also included. The monomer that forms the copolymer may be selected appropriately from known copolymerizable monomers. The modified products are exemplified as follows.

Examples of the modified products of the PVA derivatives may include: a polymer in which at least part of the hydroxyl groups of the hydroxyethylene unit is modified into carboxyl groups; a polymer in which part of the hydroxyl groups is modified into (meth)acryloyl groups; a polymer in which at least part of the hydroxyl groups is modified into amino groups; and a polymer in which ethylene glycol, propylene glycol, or a multimer thereof is introduced into at least part of the hydroxyl groups.

The polymer in which at least part of the hydroxyl groups of the hydroxyethylene unit is modified into carboxyl groups may be obtained through esterification between polyvinyl alcohol or partly saponified polyvinyl alcohol and a multifunctional carboxylic acid such as succinic acid, maleic acid, or adipic acid.

The amount of the carboxyl groups introduced is preferably from 0.01 mol to 1.00 mol and more preferably from 0.05 mol to 0.80 mol with respect to 1 mol of the hydroxyl groups.

The polymer in which at least part of the hydroxyl groups of the hydroxyethylene unit is modified into (meth)acryloyl groups is obtained through addition of glycidyl (meth)acrylate to the above carboxyl group modified polymer or through esterification between polyvinyl alcohol or partly saponified polyvinyl alcohol and (meth)acrylic acid.

The amount of the (meth)acryloyl groups introduced is preferably from 0.01 mol to 1.00 mol and more preferably from 0.03 mol to 0.50 mol with respect to 1 mol of the hydroxyl groups. Note that, the term "(meth)acryloyl group" is a generic name of acryloyl group and/or methacryloyl group. The term "(meth)acrylate" is a generic name of acrylate and/or methacrylate. Also, the term "(meth)acrylic acid" or the like is the same.

The polymer in which at least part of the hydroxyl groups of the hydroxyethylene unit is modified into amino groups may be obtained through esterification between polyvinyl alcohol or partly saponified polyvinyl alcohol and a carboxylic acid having an amino group such as carbamic acid.

The amount of the amino groups introduced is preferably from 0.01 mol to 1.00 mol and more preferably from 0.05 mol to 0.70 mol with respect to 1 mol of the hydroxyl groups.

The polymer in which ethylene glycol, propylene glycol, or a multimer thereof is introduced into at least part of the hydroxyl groups of the hydroxyethylene unit may be obtained by a method in which polyvinyl alcohol or partly saponified polyvinyl alcohol and glycols are heated in the presence of a sulfuric acid catalyst while by-product water is removed from the reaction system.

The amount of the ethylene glycol or propylene glycol or multimer thereof introduced is preferably from 0.01 mol to 0.90 mol and more preferably from 0.03 mol to 0.50 mol with respect to 1 mol of the hydroxyl groups.

Among these modified products, the polymer in which at least part of the hydroxyl groups of the hydroxyethylene unit is modified into (meth)acryloyl groups is preferably used. Namely, by directly introducing an unreacted crosslinkable functional group into the hydrophilic polymer, the strength of resulting cured films may be increased without using a large amount of a polymerizable compound having an ethylenic unsaturated bond that is described later, thereby enabling the resulting cured films to attain both flexibility and strength.

As the vinyl polymers of the present invention, polyvinyl acetal may be also effectively used. Polyvinyl acetal obtained by treating polyvinyl alcohol with aldehydes may be used. Examples of the aldehydes that are used for the acetal treatment are specifically described below, but they are not limitative.

Specific examples of the aldehydes used for the acetal treatment may include: aliphatic aldehydes such as formaldehyde, acetaldehyde, propione aldehyde, n-butyl aldehyde, t-butyl aldehyde, amyl aldehyde, hexyl aldehyde, or 2-ethylhexyl aldehyde; alicyclic aldehydes such as cyclohexyl aldehyde or furfural; and aromatic aldehydes such as benzaldehyde, an alkyl-substituted benzaldehyde, a halogen-substituted benzaldehyde, or a phenyl-substituted alkylaldehyde. Of these, acetaldehyde and butylaldehyde are preferably used because they are easy to handle. These aldehydes may be used solely or in a combination of two or more kinds.

Polyamide

Polyamide may be obtained by polycondensation between a diamine compound and a dicarboxylic acid compound, polycondensation of an aminocarboxylic acid compound, ring-opening polymerization of lactams, and others.

Examples of the diamine compound, dicarboxylic acid compound, aminocarboxylic acid compound, and lactams that are used for the synthesis of the polyamide in the present invention are described below, but the present invention is in no way limited by these examples.

Examples of the diamine compound may include: ethylenediamine, 1,3-propanediamine, 1,2-propanediamine, hexamethylenediamine, octamethylenediamine, o-phenylenediamine, m-phenylenediamine, p-phenylenediamine, piperazine, 2,5-dimethylpiperazine, 4,4'-diaminophenylether, 3,3'-diaminodiphenylsulfone, and xylylenediamine.

Examples of the dicarboxylic acid compound may include: oxalic acid, malonic acid, succinic acid, glutaric acid, dimethyl malonic acid, adipic acid, pimelic acid, α,α-dimethyl succinic acid, acetone dicarboxylic acid, sebacic acid, 1,9-nonane dicarboxylic acid, fumaric acid, maleic acid, itaconic acid, citraconic acid, phthalic acid, isophthalic acid, terephthalic acid, 2-butyl terephthalic acid, tetrachloro terephthalic acid, acetylene dicarboxylic acid, poly(ethylene terephthalate)dicarboxylic acid, 1,2-cyclohexane dicarboxylic acid, 1,4-cyclohexane dicarboxylic acid, ω-poly(ethyleneoxy)dicarboxylic acid, and p-xylylene dicarboxylic acid.

These dicarboxylic acid compounds may be used in the form of an alkylester (for example, dimethylester) of carboxylic acid, in the acid chloride form of dicarboxylic acid, or in the form of an acid anhydride such as maleic anhydride, succinic anhydride or phthalic anhydride.

Examples of the aminocarboxylic acid may include glycine, alanine, phenylalanine, ω-aminohexanoic acid, ω-aminodecanoic acid, ω-aminoundecanoic acid, and anthranilic acid.

Examples of the monomers (lactams) used for ring-opening polymerization may include ω-caprolactam, azetidinone, and pyrolidone.

Polyurethane

Polyurethane is basically synthesized by polyaddition reaction using a diol compound and a diisocyanate compound as raw materials.

Examples of the diol compound and diisocyanate compound that are used for polyurethane synthesis in the present invention are described below, but the present invention is in no way limited by these examples.

Specific examples of the diol compound may include: ethylene glycol, 1,2-propane diol, 1,3-propane diol, 1,3-butane diol, 2,3-butane diol, 2,2-dimethyl-1,3-propane diol, 1,4-pentane diol, 2,4-pentane diol, 3,3-dimethyl-1,2-butane diol, 2-ethyl-2-methyl-1,3-propane diol, 1,6-hexane diol, 2,5-hexane diol, 2-methyl-2,4-pentane diol, 2,2-diethyl-1,3-propane diol, 2,4-dimethyl-2,4-pentane diol, 2-methyl-2-propyl-1,3-propane diol, 2,5-dimethyl-2,5-hexane diol, 2-ethyl-1,3-hexane diol, 1,2-octane diol, 2,2,4-trimethyl-1,3-pentane diol, 1,4-cyclohexane dimethanol, diethylene glycol, triethylene glycol, dipropylene glycol, tripropylene glycol, polyethylene glycol (average molecular weight is 200, 300, 400, 600, 1,000, 1,500, or 4,000), polypropylene glycol (average molecular weight is 200, 400, or 1,000), polyester polyol, 4,4'-dihydroxy-diphenyl-2,2-propane, 4,4-dihydroxyphenylsulfone, 2,2-bis(hydroxymethyl) propionic acid, 2,2-bis(hydroxymethyl)butanoic acid, 2,5,6-trimethoxy-3,4-dihydroxy hexanoic acid, 2,3-dihydroxy-4,5-dimethoxy pentanoic acid, 2,4-di(2-hydroxy) ethyloxycarbonylbenzene sulfonic acid, and salts thereof.

Preferable specific examples of the diisocyanate compound may include: ethylene diisocyanate, isophorone diisocyanate, hexamethylene diisocyanate, 1,4-cyclohexane diisocyanate, 2,4-toluene diisocyanate, 1,3-xylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, dicyclohexylmethane diisocyanate, and methylene bis(4-cyclohexyl isocyanate).

Polyurea

Polyurea may be basically obtained by polyaddition between a diamine compound and a diisocyanate compound or deammoniation between a diamine compound and urea.

Examples of the diamine compound and diisocyanate compound that are used for the synthesis of polyurea in the present invention are described below, but the present invention is in no way limited by these examples.

Examples of the diamine compound may include a compound that is selected from the same group of diamines as that described in the foregoing section of polyamide.

Further, examples of the diisocyanate compound may include a compound selected from the same group of diisocyanates as that described in the foregoing section of polyurethane.

In the present invention, as the binder polymer, from the viewpoint of engraving sensitivity, vinyl polymers are particularly preferable and vinyl polymers that are soluble in water and/or ethanol are still more preferable.

The mechanism in the present invention is not clear but may be speculated as follows.

Laser engraving (particularly in the case of near infrared laser engraving) performed in the present invention may include five processes: (1) light absorption by (D) a photothermal conversion agent; (2) photothermal conversion by the (D) photothermal conversion agent; (3) heat transfer from the photothermal conversion agent to (A) a binder polymer and/or a crosslinked product (polymerized product) of (C) a polymerizable compound near the photothermal conversion agent; (4) thermal decomposition of the (A) binder polymer and/or the crosslinked product (polymerized product) of the (C) polymerizable compound; and (5) dissipation or scattering of the decomposed (A) binder polymer and/or crosslinked product (polymerized product) of the (C) polymerizable compound.

In the present invention, by using the combination of the (A) binder polymer and (B) a metal compound that is described later, the (B) metal compound is coordinated to a nucleophilic site of the (A) binder polymer, thereby presumably promoting the above process (4) and considerably increasing laser engraving sensitivity. In particular, in the case of using a vinyl polymer as the (A) binder polymer, by combining the vinyl polymer and the (B) metal compound that effectively acts to the vinyl polymer, electrophilic attack of the (B) metal compound to the vinyl polymer catalyzes the elimination of the side chain of the vinyl polymer, thereby presumably lowering the decomposition temperature and increasing engraving sensitivity.

In the present invention, a weight average molecular weight (evaluated by GPC measurement in terms of polystyrene) of the binder polymer is preferably from 5,000 to 500,000. When the weight average molecular weight is 5,000 or more, an excellent shape retention property as a single resin is attained. When 500,000 or less, the binder polymer is easy to dissolve in solvent such as water and is advantageous for preparing a resin composition for laser engraving. The weight average molecular weight of the binder polymer is more preferably from 10,000 to 400,000 and particularly preferably from 15,000 to 300,000.

The total content of the binder polymer is, with respect to the total solid mass of the resin composition for laser engraving, preferably from 5% to 80% by mass, more preferably from 15% to 75% by mass, and still more preferably from 20% to 65% by mass.

For example, when the resin composition for laser engraving of the present invention is used for a relief forming layer of a relief printing plate precursor, by selecting the content of the binder polymer to be 15% by mass or more, sufficient printing durability of the resulting relief printing plate to be used as a printing plate is attainable. By selecting 75% by mass or less, the content of the other components is not insufficient, and sufficient flexibility of the resulting relief printing plate to be used as a flexo printing plate is attainable.

<(B) Metal Compound>

The resin composition for laser engraving of the present invention contains (B) a metal compound containing a metal selected from the group consisting of metals in Group 1 to Group 15 in the periodic table.

The term "metal" used herein in the present invention refers to the one that is classified as metal in the periodic table of the elements, and specifically the one that is classified as metal in the periodic table described in page 283 and later of "Inorganic Chemistry 3rd Ed., by D. F. Shriver and P. W. Atkins, published by OXFORD University Press in 1999. Examples of the metal may include: an alkali metal such as sodium or potassium; an alkaline earth metal such as magnesium or calcium; a transition metal such as titanium, vanadium, molybdenum, manganese, iron, cobalt, nickel, copper or zinc; and a representative element such as aluminum, gallium, tin, lead or bismuth.

As the metal compound in the present invention, any compound that contains metal selected from the group consisting of metals in Group 1 to Group 15 in the periodic table is usable, but elemental metal or alloys are not included. As the metal compound, specifically, a metal salt or a metal complex is preferably used.

Hereinafter, a metal compound that is preferably used in the present invention will be described specifically.

The metal compound in the present invention contains preferably at least one metal selected from the group consisting of metals in Group 1, Group 2, Group 4, Group 12, Group 13, Group 14, and Group 15 in the periodic table from the viewpoint of engraving sensitivity.

Particularly, from the viewpoint of engraving sensitivity and rinsing property of engraving scraps, a metal compound that contains at least one metal selected from the group consisting of Na, K, Ca, Mg, Ti, Zr, Al, Zn, Sn, and Bi is preferable.

In the present invention, there is not any particular limitation on the anionic portion of the metal compound, and the anionic portion may be selected arbitrarily in accordance with purposes. However, from the viewpoint of thermal stability, the metal compound is preferably at least one selected from the group consisting of oxides, sulfides, halides, carbonates, carboxylates, sulfonates, phosphates, nitrates, sulfates, alkoxides, hydroxides, and acetylacetonate complexes that may have a substituent group.

Particularly, at least one metal compound, which is selected from the group consisting of halides, carboxylates, nitrates, sulfates, hydroxides, and acetylacetonate complexes that may have a substituent group, is preferable.

More specifically, in the present invention, preferably, the metal compound contains at least one metal selected from the group consisting of metals in Group 1, Group 2, Group 4, Group 12, Group 13, Group 14, and Group 15 in the periodic table, and the metal compound is an oxide, sulfide, halide, carbonate, carboxylate, sulfonate, phosphate, nitrate, sulfate, alkoxide, hydroxide, or acetylacetonate complex of the at least one metal, wherein the acetylacetonate complex may have a substituent group.

Particularly preferably, the metal compound contains at least one metal selected from the group consisting of Na, K, Ca, Mg, Ti, Zr, Al, Zn, Sn, and Bi, and the metal compound is an oxide, sulfide, halide, carbonate, carboxylate, sulfonate, phosphate, nitrate, sulfate, alkoxide, hydroxide, or acetylacetonate complex of the at least one metal, wherein the acetylacetonate complex may have a substituent group.

Alternatively, a metal compound that contains at least one metal selected from the group consisting of metals in Group 1, Group 2, Group 4, Group 12, Group 13, Group 14, and Group 15 of the periodic table and is a halide, carboxylate, nitrate, sulfate, hydroxide, or acetylacetonate complex of the at least one metal, wherein the acetylacetonate complex may have a substituent group, is also preferable.

Among these, a metal compound that contains at least one metal selected from the group consisting of Na, K, Ca, Mg, Ti, Zr, Al, Zn, Sn, and Bi and is a halide, carboxylate, nitrate, sulfate, hydroxide, or acetylacetonate complex of the at least one metal, wherein the acetylacetonate complex may have a substituent group, is particularly preferable.

Examples of a preferable combination of the metal and anionic portion of the metal compound in the present invention are described below.

Na: alkoxide, carboxylate, or acetylacetonate complex that may have a substituent group;

K: alkoxide, carboxylate, or acetylacetonate complex that may have a substituent group;

Ca: oxide, halide, carboxylate, nitrate, or acetylacetonate complex that may have a substituent group;

Mg: oxide, halide, carboxylate, nitrate, or acetylacetonate complex that may have a substituent group;

Ti: alkoxide or acetylacetonate complex that may have a substituent group;

Zr: alkoxide or acetylacetonate complex that may have a substituent group;

Al: chloride, alkoxide, hydroxide, carboxylate, or acetylacetonate complex that may have a substituent group;

Zn: oxide, halide, carboxylate, or acetylacetonate complex that may have a substituent group;

Sn: halide, carboxylate, or acetylacetonate complex that may have a substituent group; and Bi: halide, carboxylate, or acetylacetonate complex that may have a substituent group.

More specific examples of the metal compound in the present invention may include: sodium methoxide, sodium acetate, sodium 2-ethylhexanoate, (2,4-pentanedionato) sodium, potassium butoxide, potassium acetate, potassium 2-ethylhexanoate, (2,4-pentanedionato) potassium, calcium fluoride, calcium chloride, calcium bromide, calcium iodide, calcium oxide, calcium sulfide, calcium acetate, calcium 2-ethylhexanoate, calcium phosphate, calcium nitrate, calcium sulfate, calcium ethoxide, bis(2,4-pentanedionato)calcium, magnesium fluoride, magnesium chloride, magnesium bromide, magnesium iodide, magnesium oxide, magnesium sulfide, magnesium acetate, magnesium 2-ethylhexanoate, magnesium phosphate, magnesium nitrate, magnesium sulfate, magnesium ethoxide, bis(2,4-pentanedionato)magnesium, titanium ethoxide, bis(2,4-pentanedionato)titanium oxide, zirconium ethoxide, tetrakis(2,4-pentanedionato) zirconium, vanadium chloride, manganese oxide, bis(2,4-pentanedionato)manganese, iron chloride, tris(2,4-pentanedionato)iron, iron bromide, ruthenium chloride, cobalt chloride, rhodium chloride, iridium chloride, nickel chloride, bis(2,4-pentanedionato)nickel, palladium chloride, palladium acetate, bis(2,4-pentanedionato)palladium, platinum chloride, copper chloride, copper oxide, copper sulfate, bis(2,4-pentanedionato)copper, silver chloride, aluminum isopropoxide, bis(acetato)hydroxy aluminum, bis(2-ethylhexanoato)hydroxy aluminum, dihydroxy aluminum stearate, hydroxy aluminum bis(stearate), aluminum tris (stearate), tris(2,4-pentanedionato)aluminum, zinc chloride, zinc nitrate, zinc acetate, zinc benzoate, zinc oxide, zinc sulfide, bis(2,4-pentanedionato)zinc, zinc 2-ethylhexanoate, tin chloride, tin 2-ethylhexanoate, bis(2,4-pentanedionato)tin dichloride, lead chloride, bismuth 2-ethylhexanoate, and bismuth nitrate.

The metal compound as described above may be selected in accordance with the kind of the (A) binder polymer, considering the effectiveness for improving engraving sensitivity. A preferable combination of the (A) binder polymer and the metal compound is described below.

For the vinyl polymers, a metal compound containing sodium, potassium, calcium, magnesium, nickel, aluminum, zinc, tin, or bismuth is preferable. Of these, an oxide, halide, carboxylate, nitrate, hydroxide, or acetylacetonate complex of these metals is more preferable, wherein the acetylacetonate complex may have a substituent group. Sodium 2-ethylhexanoate, potassium 2-ethylhexanoate, calcium oxide, calcium chloride, bis(2,4-pentanedionato)calcium, bis(2,4-pentanedionato)magnesium, bis(2-ethylhexanoato)hydroxy aluminum, zinc oxide, zinc chloride, zinc acetate, zinc nitrate, zinc 2-ethylhexanonate, tin chloride, or tin 2-ethylhexanonate is particularly preferable.

For the PVA derivative that is one of the vinyl polymers, sodium 2-ethylhexanoate, potassium 2-ethylhexanoate, calcium chloride, bis(2,4-pentanedionato)magnesium, bis(2-ethylhexanoato)hydroxy aluminum, zinc oxide, zinc chloride, zinc nitrate, zinc 2-ethylhexanoate, tin chloride, or tin 2-ethylhexanoate is particularly preferable.

For polyvinylbutyral that is one of the vinyl polymers, sodium 2-ethylhexanoate, potassium 2-ethylhexanoate, calcium oxide, calcium chloride, bis(2,4-pentanedionato) calcium, bis(2,4-pentanedionato)magnesium, bis(2-ethylhexanoato)hydroxy aluminum, zinc oxide, zinc chloride, zinc acetate, or zinc nitrate is particularly preferable.

For polyamide, a compound containing sodium, potassium, calcium, magnesium, aluminum, zinc, or tin is preferable. An oxide, halide, carboxylate, nitrate, hydroxide, or acetylacetonate complex that contains sodium, potassium, calcium, magnesium, aluminum, zinc, or tin is more preferable, wherein the acetylacetonate complex may have a substituent group. Sodium 2-ethylhexanoate, potassium 2-ethylhexanoate, calcium oxide, bis(2,4-pentanedionato) magnesium, bis(2-ethylhexanoato)hydroxy aluminum, zinc chloride, zinc nitrate, or tin 2-ethylhexanoate is particularly preferable.

For polyurethane, a metal compound containing sodium, potassium, magnesium, aluminum, zinc, tin, or nickel is preferable. An oxide, halide, carboxylate, nitrate, hydroxide, or acetylacetonate complex that contains magnesium, zinc, or tin is more preferable, wherein the acetylacetonate complex may have a substituent group. Sodium 2-ethylhexanoate, potassium 2-ethylexanoate, magnesium oxide, bis(2-ethylhexanoato) hydroxy aluminum, zinc chloride, or tin 2-ethylhexanoate is particularly preferable.

For polyurea, a metal compound containing sodium, potassium, calcium, magnesium, aluminum, zinc, tin, or copper is preferable. An oxide, halide, carboxylate, hydroxide, or acetylacetonate complex that contains magnesium, zinc, or copper is more preferable, wherein the acetylacetonate complex may have a substituent group. Sodium 2-ethylhexanoate, potassium 2-ethylexanoate, magnesium acetate, bis(2-ethylhexanoato) hydroxy aluminum, zinc chloride, or bis(2,4-petanedionato)copper is particularly preferable.

The content of the (B) metal compound in the resin composition of the present invention is, from the viewpoint of both of engraving sensitivity and film forming property, preferably from 0.01% to 50% by mass, more preferably from 0.1% to 40% by mass, and particularly preferably from 0.1% to 20% by mass, with respect to the (A) binder polymer.

In addition, the content of the (B) metal compound in the resin composition of the present invention is, from the viewpoint of both ot engraving sensitivity and film forming property, preferably from 0.01% to 30% by mass, more preferably from 0.1% to 20% by mass, and particularly preferably from 1% to 10% by mass, with respect to the total resin composition.

Hereinafter, optional components used preferably in the resin composition of the present invention will be described.

As the optional components, (C) a polymerizable compound having an ethylenic unsaturated bond, (D) a photothermal conversion agent capable of absorbing light with a wavelength of from 700 nm to 1,300 nm, a polymerization initiator and the like are preferably used.

<(C) Polymerizable Compound Having Ethylenic Unsaturated Bond>

The polymerizable compound (hereinafter, simply referred to as "polymerizable compound" in some cases) having an ethylenic unsaturated bond used in the present invention may be arbitrarily selected from compounds having at least one, preferably two or more, and more preferably from 2 to 6 ethylenic unsaturated double bonds.

A mono-functional monomer having one ethylenic unsaturated double bond in the molecule thereof and a multi-functional monomer having two or more ethylenic unsaturated double bonds in the molecule thereof that are used as the polymerizable compound are described below.

For the resin composition of the present invention, the multi-functional monomer is preferably used. The multi-functional monomer has a molecular weight of preferably from 200 to 2,000.

Examples of the mono-functional monomer and multi-function monomer may include: an ester of an unsaturated carboxylic acid (for example, acrylic acid, methacrylic acid, itaconic acid, crotonic acid, isocrotonic acid, maleic acid or the like) and a polyhydric alcohol compound; and an amide of an unsaturated carboxylic acid and a polyamine compound.

Specific examples of the ester monomer of a polyhydric alcohol compound and an unsaturated carboxylic acid may include: as an acrylic acid ester, ethylene glycol diacrylate, triethylene glycol diacrylate, 1,3-butandiol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol pentaacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, and a polyester acrylate oligomer.

As a methacrylic acid ester, tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, dipentaerythritol pentamethacrylate, sorbitol trimethacrylate, sorbitol tetramethacrylate, bis[p-(3-methacryloxy-2-hydroxypropoxy) phenyl]dimethylmethane, and bis-[p-(methacryloxyethoxy)phenyl]dimethylmethane may be used.

As an itaconic acid ester, ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate may be used.

As a crotonic acid ester, ethylene glycol dicrotonate, tetramethylene glycol dicrotonate, pentaerythritol dicrotonate, and sorbitol tetradicrotonate may be used.

As an isocrotonic acid ester, ethylene glycol diisocrotonate, pentaerythritol diisocrotonate, and sorbitol tetraisocrotonate may be used.

As a maleic acid ester, ethylene glycol dimaleate, triethylene glycol dimaleate, pentaerythritol dimaleate, and sorbitol tetramaleate may be used.

In addition, a mixture of the foregoing ester monomers may be also used.

Specific examples of the amide monomer of a polyamine compound and an unsaturated carboxylic acid may include methylene bis-acrylamide, methylene bis-methacrylamide, 1,6-hexamethylene bis-acrylamide, 1,6-hexamethylene bis-methacrylamide, diethylenetriamine tris-acrylamide, xylylene bis-acrylamide, and xylylene bis-methacrylamide.

Further, urethane acrylates as described in JP-A No. 51-37193; polyester acrylates as described in JP-A No. 48-64183, Japanese Examined Patent Application (JP-B) Nos. 49-43191 and 52-30490; and multi-functional acrylates or methacrylates such as epoxy acrylates obtained by reacting an epoxy resin and (meth)acrylic acid may be used. Still further, light curable monomers or oligomers as described in Journal of the Adhesion Society of Japan, Vol. 20, No. 7, page 300 to 308(1984) may be used.

Specifically, NK OLIGO U-4HA, U-4H, U-6HA, U-6ELH, U-108A, U-1084A, U-200AX, U-122A, U-340A, U-324A and UA-100 (trade names, manufactured by Shin-nakamura Chemical Co., Ltd.); UA-306H, AI-600, UA-101T, UA-101I, UA-306T and UA-306I (trade names, manufactured by Kyoeisha Chemical Co., Ltd.); ARTRESIN UN-9200A, UN-3320HA, UN-3320HB, UN-3320HC, SH-380G, SH-500 and SH-9832 (trade names, manufactured by Negami Chemical Industrial Co., Ltd.); and PLEX6661-O (trade name, manufactured by Degussa Corp., Germany) may be used.

In the present invention, as the polymerizable compound, from the viewpoint of improving engraving sensitivity, a compound having a sulfur atom in the molecule thereof is preferably used.

As the polymerizable compound having a sulfur atom in the molecule thereof, from the viewpoint of improving engraving sensitivity, a polymerizable compound (hereinafter, referred to as "sulfur-containing multi-functional monomer", appropriately) having two or more ethylenic unsaturated bonds and a carbon to sulfur bond that is positioned at a site where two of the ethylenic unsaturated bonds are linked together is preferably used, particularly.

As a carbon to sulfur bond containing functional group that is contained in the sulfur-containing multi-functional monomer in the present invention, a functional group that contains sulfide, disulfide, sulfoxide, sulfonyl, sulfone amide, thiocarbonyl, thiocarboxylic acid, dithiocarboxylic acid, sulfamic acid, thioamide, thiocarbamate, dithiocarbamate, or thiourea may be exemplified.

As a carbon to sulfur bond containing linking group that links two of the ethylenic unsaturated bonds in the sulfur-containing multi-functional monomer, at least one unit selected from —C—S—, —C—SS—, —NH(C=S)O—, —NH(C=O)S—, —NH(C=S)S—, and —C—SO$_2$— may be preferably exemplified.

There is not any limitation on the number of the sulfur atom contained in the molecule of the sulfur-containing multi-functional monomer as long as the number is at least 1, and the number may be appropriately selected in accordance with purposes, but the number is preferably from 1 to 10, more preferably from 1 to 5, and still more preferably from 1 to 2, from the viewpoint of balancing between engraving sensitivity and solubility in a coating solvent.

There is not any limitation on the number of the ethylenic unsaturated portions contained in the molecule as long as the number is at least 2, and the number may be selected appropriately in accordance with purposes, but the number is preferably from 2 to 10, more preferably from 2 to 6, and still more preferably from 2 to 4, from the viewpoint of flexibility of resulting crosslinked films.

As the ethylenic unsaturated portion contained in the sulfur-containing multi-functional monomer, the partial structure represented by any of the following formulas (1) to (5) is suitable, but from the viewpoint of decomposability of a polymerized product, the partial structure represented by any of formulas (1) to (3) is preferable. The partial structure represented by formula (1) is more preferable.

Note that, in the sulfur-containing multi-functional monomer of the present invention, regarding any partial structure of formulas (1) to (5), two or more same kinds or two or more different kinds may exist in one molecule.

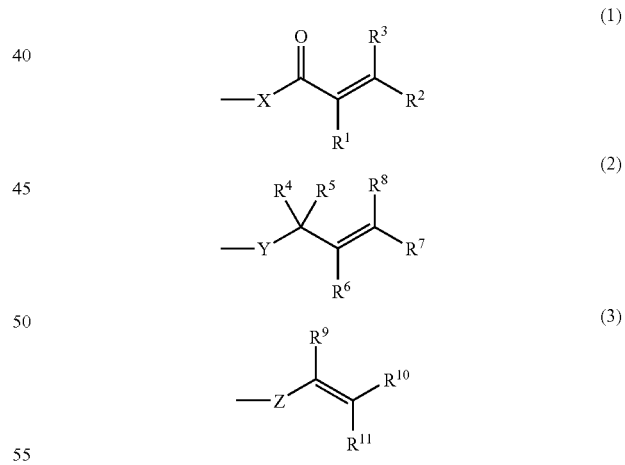

At first, there will be explained formulas (1) to (3).

In formulas (1) to (3), $R^1$ to $R^{11}$ each are independently hydrogen atom or a mono-valent substituent group. X and Y each are independently oxygen atom, sulfur atom, —NR$^a$—, or sulfonyl group. Z is oxygen atom, sulfur atom, —NR$^a$—, sulfonyl group, or phenylene group. Here, $R^a$ is hydrogen atom or a mono-valent organic group.

In formula (1), $R^1$ to $R^3$ each are independently hydrogen atom or a mono-valent substituent group.

Examples of $R^1$ may include hydrogen atom and an organic group such as an alkyl group that may have a substituent group. Of these, specifically, hydrogen atom, methyl group, methylalkoxy group, or methylester group is preferable.

$R^2$ and $R^3$ each may independently be: hydrogen atom, a halogen atom, amino group, a dialkylamino group, carboxyl group, an alkoxycarbonyl group, sulfo group, nitro group, cyano group, an alkyl group that may have a substituent group, an aryl group that may have a substituent group, an alkoxy group that may have a substituent group, an aryloxy group that may have a substituent group, an alkylamino group that may have a substituent group, an arylamino group that may have a substituent group, an alkylsulfonyl group that may have a substituent group, or an arylsulfonyl group that may have a substituent group. Of these, hydrogen atom, carboxyl group, an alkoxycarbonyl group, an alkyl group that may have a substituent group, or an aryl group that may have a substituent group is preferable. Examples of the substituent group that may be introduced into these groups may include methoxycarbonyl group, ethoxycarbonyl group, isopropoxycarbonyl group, methyl group, ethyl group, and phenyl group.

X is preferably oxygen atom, sulfur atom, or $—NR^a—$; examples of $R^a$ may include an alkyl group that may have a substituent group.

In formula (2), $R^4$ to $R^8$ each are independently hydrogen atom or a mono-valent substituent group.

Examples of $R^4$ to $R^8$ may include: hydrogen atom, a halogen atom, amino group, a dialkylamino group, carboxyl group, an alkoxycarbonyl group, sulfo group, nitro group, cyano group, an alkyl group that may have a substituent group, an aryl group that may have an substituent group, an alkoxy group that may have a substituent group, an aryloxy group that may have a substituent group, an alkylamino group that may have a substituent group, an arylamino group that may have a substituent group, an alkylsulfonyl group that may have a substituent group, and an arylsulfonyl group that may have a substituent group. Of these, hydrogen atom, carboxyl group, an alkoxycarbonyl group, an alkyl group that may have a substituent group, or an aryl group that may have a substituent group is preferable. Examples of the substituent group that may be introduced into these groups may include the ones exemplified as the substituent group that may be introduced in formula (1).

Y is preferably oxygen atom, sulfur atom, or $—NR^a—$; and as $R^a$, examples similar to the ones in formula (1) may be exemplified.

In formula (3), $R^9$ to $R^{11}$ each are independently hydrogen atom or a mono-valent substituent group.

Specific examples of $R^9$ to $R^{11}$ may include: hydrogen atom, a halogen atom, amino group, a dialkylamino group, carboxyl group, an alkoxycarbonyl group, sulfo group, nitro group, cyano group, an alkyl group that may have a substituent group, an aryl group that may have an substituent group, an alkoxy group that may have a substituent group, an aryloxy group that may have a substituent group, an alkylamino group that may have a substituent group, an arylamino group that may have a substituent group, an alkylsulfonyl group that may have a substituent group, and an arylsulfonyl group that may have a substituent group. Of these, hydrogen atom, carboxyl group, an alkoxycarbonyl group, an alkyl group that may have a substituent group, or an aryl group that may have a substituent group is preferable. Examples of the substituent group that may be introduced into these groups may include the ones exemplified as the substituent group that may be introduced in formula (1).

Z is preferably oxygen atom, sulfur atom, $—NR^a—$, or phenylene group; and as $R^a$, examples similar to the ones in formula (1) may be exemplified.

The sulfur-containing multi-functional monomer in the present invention may include, besides the partial structure represented by any of formulas (1) to (3), a linking group L that links the ethylenic unsaturated portions. L represents a di-valent or more linking group that has a carbon to sulfur bond. From the viewpoint of thermal decomposability, the linking group L preferably has an ester bond besides a carbon to sulfur bond. In a more preferable embodiment, the linking group L has an ester bond and a hydroxyl group at the same time.

As a functional group having a carbon to sulfur bond that is incorporated in the linking group L, a functional group that contains sulfide, disulfide, sulfoxide, sulfonyl, sulfone amide, thiocarbonyl, thiocarboxylic acid, dithiocarboxylic acid, sulfamic acid, thioamide, thiocarbamate, dithiocarbamate, or thiourea may be exemplified. From the viewpoint of engraving sensitivity, a functional group that contains disulfide, thiocarbamate or dithiocarbamate is preferable. A functional group that contains disulfide is more preferable.

The linking group L contains preferably a hydrocarbon group besides the functional group having a carbon to sulfur bond. Particularly, the linking group L has a total carbon number of preferably from 1 to 10. Among these, the linking group L contains preferably plural hydrocarbon groups that have from 1 to 6 carbon atoms respectively and are linked together through a structure, such as an ester, other than hydrocarbon groups. As the hydrocarbon group, an alkylene group having from 1 to 6 carbon atoms, phenylene group or the like is preferable. As the structure, other than hydrocarbon groups, that is included in the linking group L, besides ester bond, amide bond, urea bond, urethane bond, ether bond, and carbonyl group may be preferably exemplified, but ester bond is the most preferable. The hydrocarbon group may be substituted appropriately by a mono-valent substituent group. As the substituent group, hydroxyl group, thiol group, amino group, carboxyl group, cyano group, nitro group or the like is preferably used. Particularly, as the hydrocarbon group that is included in the linking group L, a hydrocarbon group substituted by a hydroxyl group is preferable. The linking group L preferably has a structure having from 1 to 5 hydrocarbon groups per one ethylenic unsaturated bond.

Preferable specific examples of the sulfur-containing multi-functional monomer having the partial structure represented by any of formulas (1) to (3) are described below, but the present invention is in no way limited by these examples.

Rs in the following specific examples represent hydrogen atom or methyl group, and these may be the same or different from each other.

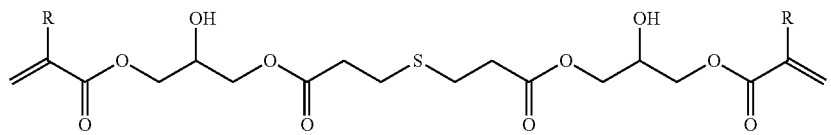

-continued
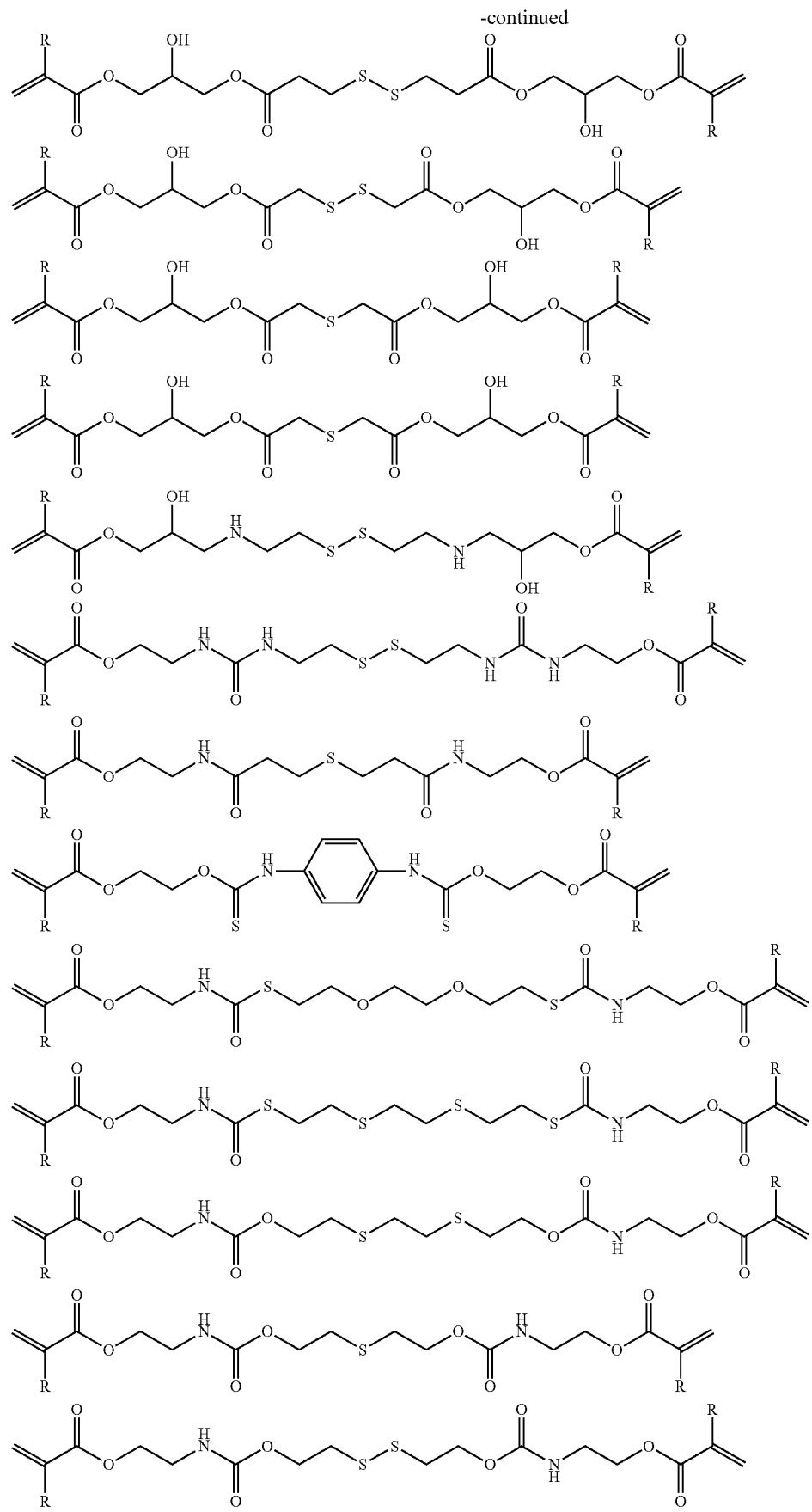

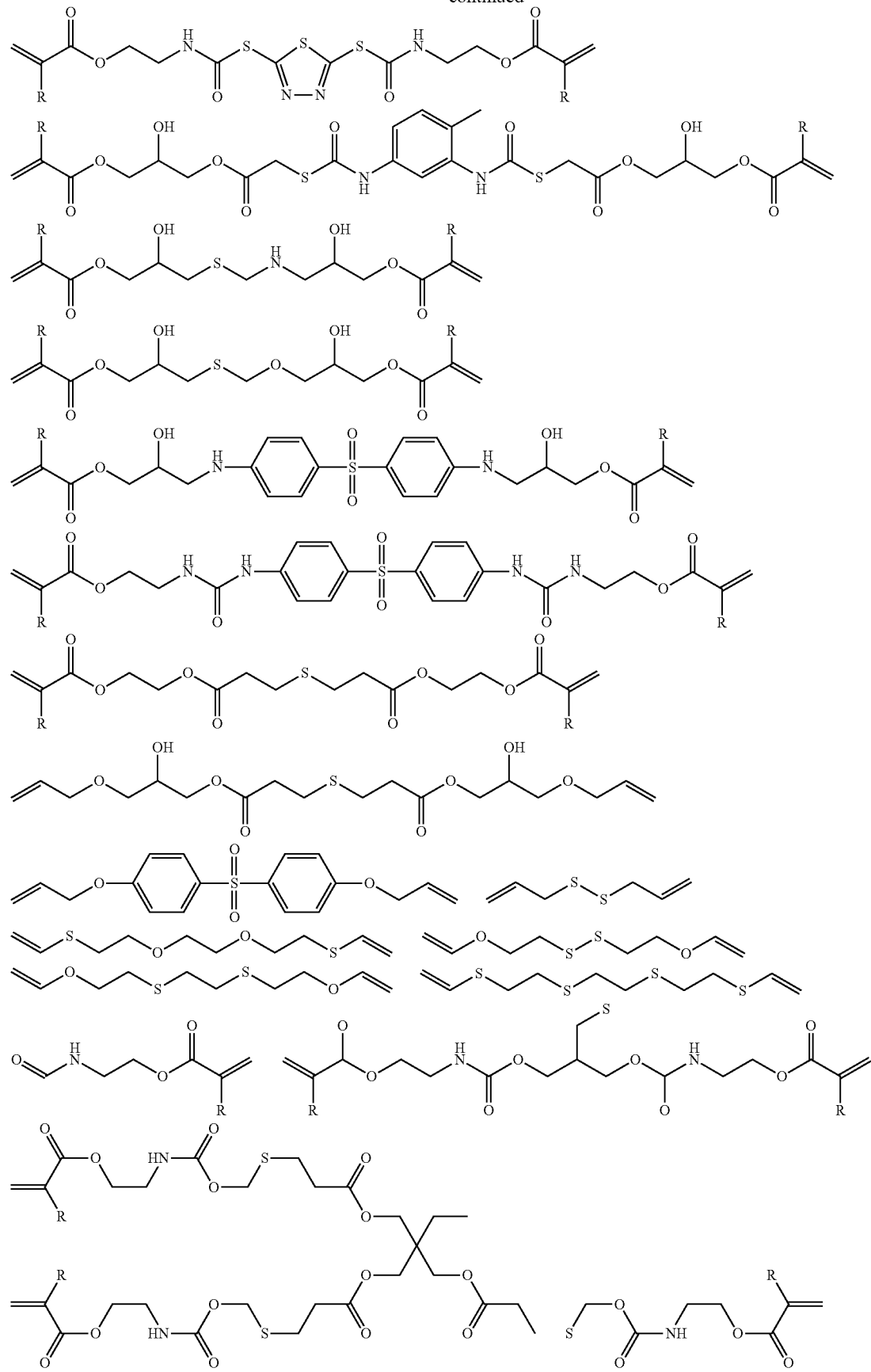

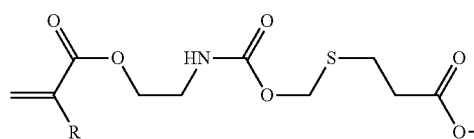
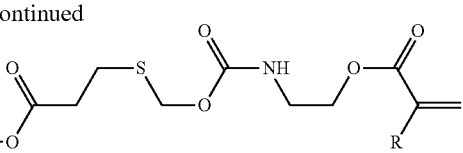

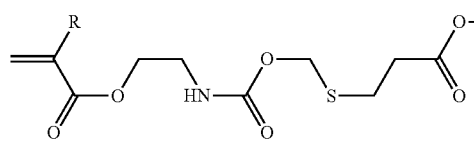

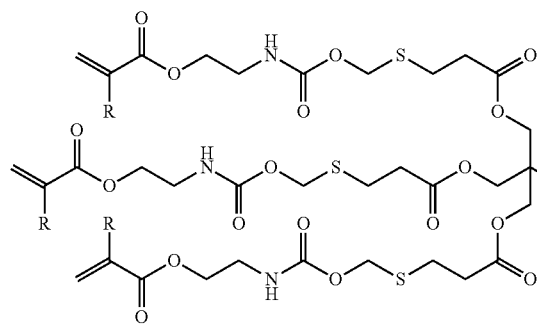
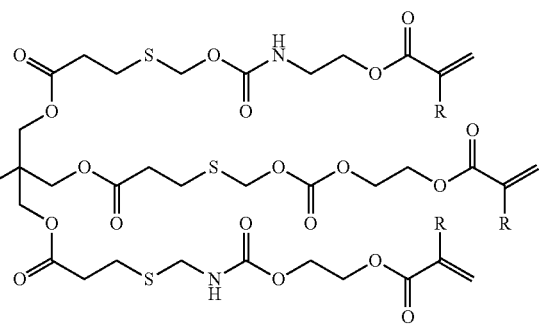

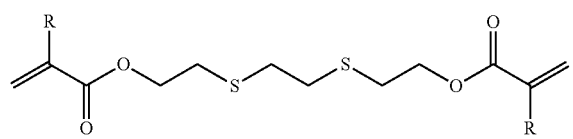

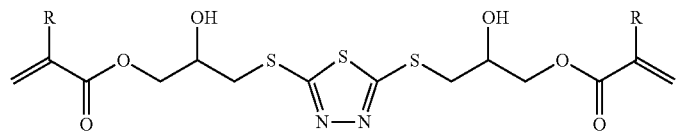

40

Next, there will be described the partial structures represented by the following formulas (4) and (5).

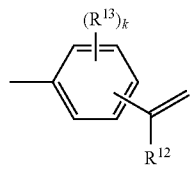

(4)

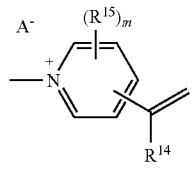

(5)

In formula (4), $R^{12}$ is hydrogen atom or methyl group; $R^{13}$ is an atom or atomic group that may substitute; k is an integer of from 0 to 4

In formula (5), $R^{14}$ is hydrogen atom or methyl group; $R^{15}$ is an atom or atomic group that may substitute; m is an integer of from 0 to 4; and $A^-$ is a counter anion.

The pyridinium ring may be in the form of a benzopyridinum having a condensed benzene ring in which two $R^{15}$s link together to form the benzene ring. In this case, a quinolium or isoquinolium group is included.

The atoms or atomic groups represented by $R^{13}$ and $R^{15}$ each are independently a halogen atom, amino group, a dialkylamino group, carboxyl group, an alkoxycarbonyl group, sulfo group, nitro group, cyano group, an alkyl group that may have a substituent group, an aryl group that may have a substituent group, an alkoxy group that may have a substituent group, an aryloxy group that may have a substituent group, an alkylamino group that may have a substituent group, an arylamino group that may have a substituent group, an alkylsulfonyl group that may have a substituent group, an arylsulfonyl group that may have a substituent group, and the like. Of these, carboxyl group, an alkoxycarbonyl group, an alkyl group that may have a substituent group, and an aryl group that may have a substituent group are preferable. Examples of the substituent group that may be introduced into these groups may include methoxycarbonyl group, ethoxycarbonyl group, isopropoxycarbonyl group, methyl group, ethyl group, and phenyl group.

Examples of the counter anion represented by $A^-$ may include: $F^-$, $Cl^-$, $Br^-$, $I^-$, $BF_4^-$, $PF_6^-$, $AsF_6^-$, $SbF_6^-$, $BAr_4^-$ (Ar is an aryl group that may be substituted by arbitrary number of fluorine atom or $CF_3$; the four Ars may be the same or different from one another), $CF_3SO_3^-$, p-$CH_3C_6H_4SO_3^-$, $CH_3SO_3^-$, and $CF_3COO^-$.

The sulfur-containing multi-functional monomer in the present invention may include, besides the partial structure represented by formula (4) or (5), a linking group L that links the ethylenic unsaturated portions. The linking group L has the same meaning as that of the foregoing linking group L, and the preferable examples thereof are also the same.

Preferable examples of the sulfur-containing multi-functional monomer having the partial structure represented by formula (4) or formula (5) are described below, but the present invention is in no way limited by these examples.

Rs in the specific examples represents hydrogen atom or methyl group, these Rs may be the same or different from each other.

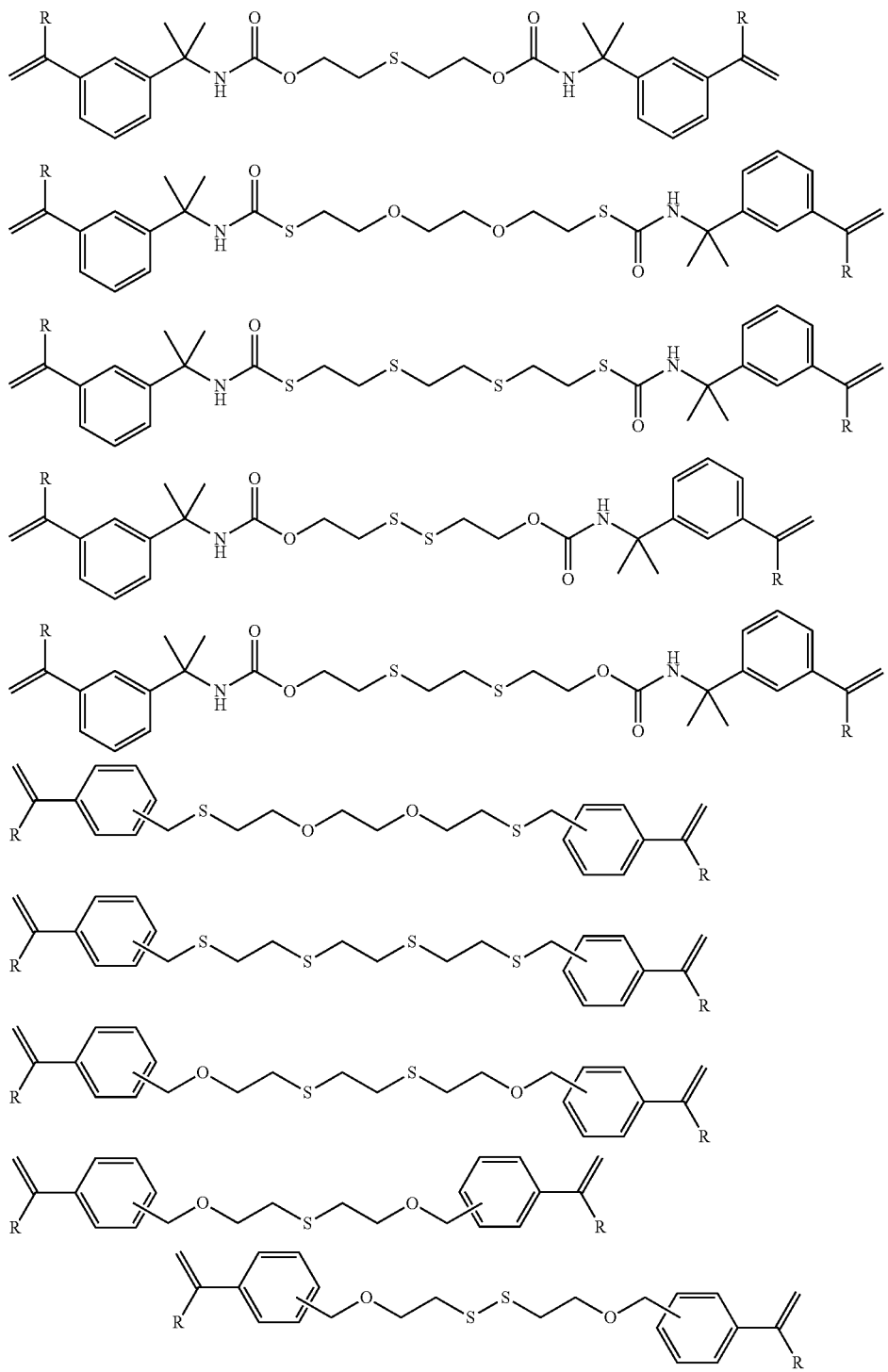

-continued
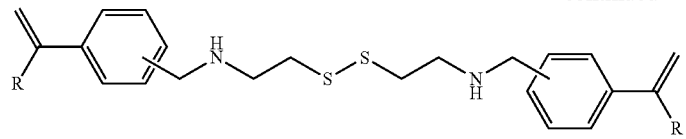
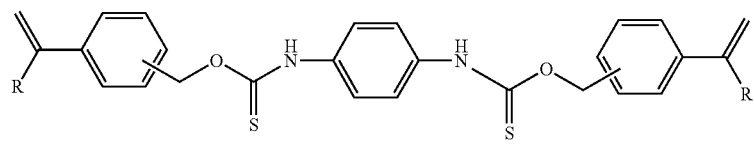
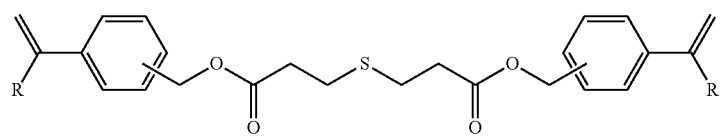
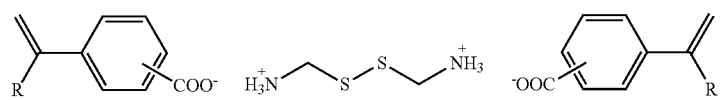
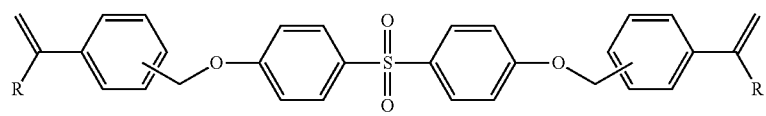
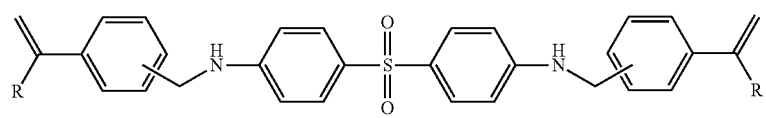
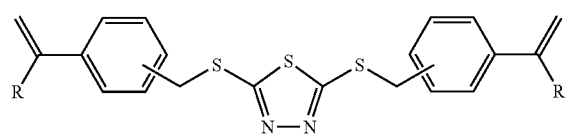
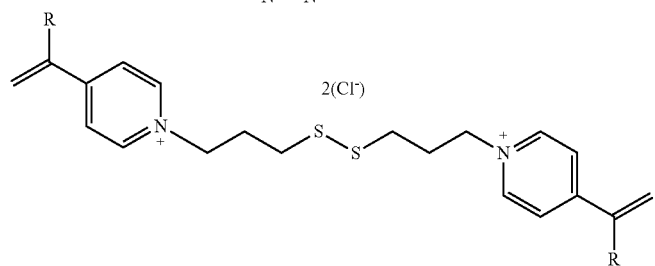
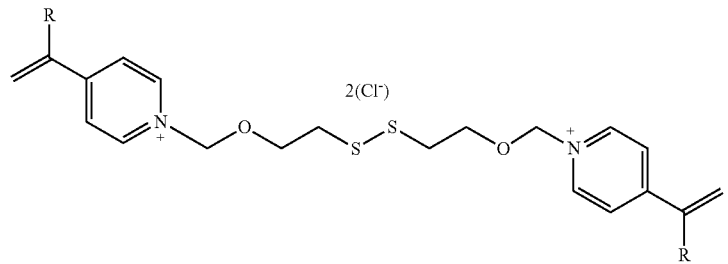
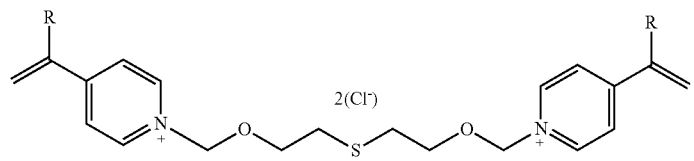

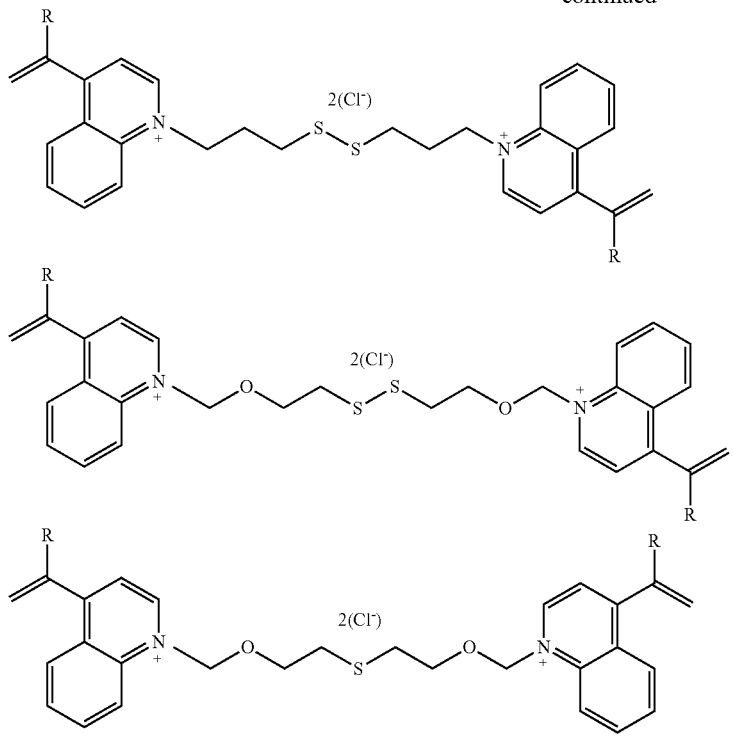

The sulfur-containing multi-functional monomer in the present invention may be synthesized through a reaction between a sulfur atom containing dicarboxylic acid and an epoxy group containing (meth)acrylate; a reaction between a sulfur atom containing diol and an isocyanate containing (meth)acrylate; a reaction between a dithiol and an isocyanate containing (meth)acrylate; a reaction between a diisocyanate and a hydroxy group containing (meth)acrylate; a known esterification; and the like. Alternatively, commercially available products may be used.

The molecular weight of the sulfur-containing multi-functional monomer is, from the viewpoint of the flexibility of resulting films, preferably from 120 to 3,000 and more preferably from 120 to 1,500.

The sulfur-containing multi-functional monomer in the present invention may be used solely, but may be used as a mixture with a multi-functional or mono-functional polymerizable compound that has no sulfur atom in the molecule thereof.

From the viewpoint of engraving sensitivity, a mode of using the sulfur-containing multi-functional monomer solely or a mode of using the sulfur-containing multi-functional monomer as a mixture with a mono-functional ethylenic monomer is preferable. A mode of using the sulfur-containing multi-functional monomer as a mixture with a mono-functional ethylenic monomer is more preferable.

In the resin composition of the present invention, film properties such as brittleness or flexibility may be also controlled by using polymerizable compounds including the sulfur-containing multi-functional monomer.

The total amount of the polymerizable compounds including the sulfur-containing multi-functional monomer in the resin composition of the present invention is, from the viewpoint of the flexibility or brittleness of resulting crosslinked films, in the range of preferably from 10% to 60% by mass and more preferably from 15% to 45% by mass, with respect to the nonvolatile components in the composition.

Note that, when the sulfur-containing multi-functional monomer and the other polymerizable compounds are used in combination, the content of the sulfur-containing multi-functional monomer in whole polymerizable compounds is preferably at least 5% by mass and more preferably at least 10% by mass.

<(D) Photothermal Conversion Agent>

The resin composition for laser engraving of the present invention preferably contains (D) a photothermal conversion agent.

It is considered that the photothermal conversion agent absorbs laser beam and generates heat, thereby promoting thermal decomposition of the cured product of the resin composition for laser engraving of the present invention. For this reason, a photothermal conversion agent that absorbs light having a laser wavelength used for engraving is selected preferably.

When a laser (YAG laser, semiconductor laser, fiber laser, surface emitting laser, or the like) emitting infrared light with a wavelength of from 700 nm to 1,300 nm is used as a light source for laser engraving, the relief forming layer in the present invention preferably contains a photothermal conversion agent capable of absorbing light with a wavelength of from 700 nm to 1,300 nm.

As the photothermal conversion agent in the present invention, various kinds of dyes or pigments may be used.

As the dyes that are included in the photothermal conversion agents, commercially available dyes or known dyes described in a document such as "Senryo Binran" (edited by Yuki Gosei Kagaku Kyokai, published in 1970) are usable, for example. Specific examples thereof may include azo dyes, metal complex salt azo dyes, pyrazolone azo dyes, naphthoquinone dyes, anthraquinone dyes, phthalocyanine dyes, carbonium dyes, diimmonium dyes, quinoneimine dyes, methine dyes, cyanine dyes, squarylium dyes, pyrylium salts, and metal thiolate complexes.

As the dyes preferably used in the present invention, the dyes described in the paragraphs [0124] to [0137] in JP-A No. 2008-63554 may be exemplified.

One of the preferable photothermal conversion agents used in the present invention is at least one compound selected from cyanine compounds and phthalocyanine compounds, from the viewpoint of having a high engraving sensitivity. Furthermore, when these photothermal conversion agents are used in a combination (manner) that the thermal decomposition temperature of the photothermal conversion agents is equal or higher than the thermal decomposition temperature of a hydrophilic polymer that is suitably used as the binder polymer, the engraving sensitivity is desirably likely to become still higher.

Of the dyes that are included in the photothermal conversion agents used in the present invention, a dye having a maximum absorption at a wavelength of from 700 nm to 1,300 nm is preferable.

As the dyes preferably used in the present invention, among cyanine dyes such as heptamethine cyanine dyes; oxonol dyes such as pentamethine oxonol dyes; indolium dyes; benzindolium dyes; benzothiazolium dyes; quinolinium dyes; and phthalide compounds or the like that are reacted with a developer, dyes having a maximum absorption wavelength of from 700 nm to 1,300 nm may be exemplified. Optical absorption properties are considerably changed depending on the kind of substituent groups and the position thereof in the molecule, the number of conjugated bonds, the kinds of counter ions, the environment around the pigment molecules, and others.

Commercially available common laser pigments, saturated absorption pigments, near infrared ray absorption pigments are also usable. Examples of the laser pigments may include: "ADS740PP", "ADS745HT", "ADS760MP", "ADS740WS", "ADS765WS", "ADS745HO", "ADS790NH" and "ADS800NH" (trade names, American Dye Source, Inc., Canada); and "NK-3555", "NK-3509" and "NK-3519" (trade names, manufactured by Hayashibara Biochemical Laboratories, Inc.). Examples of the near infrared ray absorption pigments may include: "ADS775MI", "ADS775MP", "ADS775HI", "ADS775PI", "ADS775PP", "ADS780MT", "ADS780BP", "ADS793EI", "ADS798MI", "ADS798MP, "ADS800AT", "ADS805PI", "ADS805PP", "ADS805PA", "ADS805PF", "ADS812MI", "ADS815EI", "ADS818HI", "ADS818HT", "ADS822MT", "ADS830AT", "ADS838MT", "ADS840MT", "ADS845BI", "ADS905AM", "ADS956BI", "ADS1040T", "ADS1040P", "ADS 1045P", "ADS1050P", "ADS 1060A", "ADS1065A", "ADS1065P", "ADS1100T", "ADS1120F", "ADS1120P", "ADS780WS", "ADS785WS", "ADS790WS", "ADS805WS", "ADS820WS", "ADS830WS", "ADS850WS", "ADS780HO", "ADS810CO", "ADS820HO", "ADS821NH", "ADS840NH", "ADS880MC", "ADS890MC" and "ADS920MC (trade names, American Dye Source, Inc., Canada); "YKR-2200", "YKR-2081", "YKR-2900", "YKR-2100" and "YKR-3071" (trade names, manufactured by Yamamoto Chemicals Inc.); "SDO-1000B" (trade name, manufactured by Arimoto Chemical Co., Ltd.); and "NK-3508" and "NKX-114" (trade name, manufactured by Hayashibara Biochemical Laboratories, Inc.). Note that, these are not limitative.

As the pigments that are included in the photothermal conversion agents used in the present invention, commercially available pigments and the pigments described in "Color Index (C. I.) Binran", "Saishin Ganryo Binran" (edited by Nippon Ganryo Gijutsu Kyokai, published in 1977), "Saishin Ganryo Oyo Gijutsu" (published by CMC Publishing Co., Ltd., 1986), and "Insatsu Ink Gijutsu" (published by CMC Publishing Co., Ltd., 1984) are usable.

Regarding the kinds of the pigments, black color pigments, yellow color pigments, orange color pigments, brown color pigments, red color pigments, purple color pigments, blue color pigments, green color pigments, fluorescent pigments, metal power pigments, and polymer bonded pigments may be exemplified. Specifically, insoluble azo pigments, azo lake pigments, condensed azo pigments, chelate azo pigments, phthalocyanine pigments, anthraquinone pigments, perylene or perinone pigments, thioindigo pigments, quinacridone pigments, dioxazine pigments, isoindolinone pigments, quinophthalone pigments, dyeing lake pigments, azine pigments, nitroso pigments, nitro pigments, natural pigments, fluorescent pigments, inorganic pigments, carbon black, and the like are usable. Among these pigments, carbon black is preferable.

Any carbon blacks, including those classified in accordance with ASTM and those for various applications (for example, for use in coloring, rubbers, or dry cells), are usable as long as they show stable dispersibility or the like in the composition. Examples of carbon blacks include furnace black, thermal black, channel black, lamp black, and acetylene black, for example. In order to disperse easily the black colorant such as carbon black, color chips or paste may be used, in which the black colorant is preliminary dispersed in nitrocellulose or a binder, if necessary, with a dispersing agent. These chips or paste are easily available in the market.

In the present invention, a variety of carbon blacks from the one having a relatively small specific surface area and a relatively low DBP absorption to the finely pulverized one having a larger specific surface area may be used. Preferable examples of carbon black may include "PRINTEX (registered trademark) U", "PRINTEX (registered trademark) A", and "SPEZIALSCHWARZ (registered trademark) 4" (available from Degussa Corp.).

As carbon black applicable to the present invention, a conductive carbon black having a specific surface area of at least 150 m$^2$/g and a DBP number of at least 150 ml/100 g is preferable, from the viewpoint of enhancing engraving sensitivity by conducting efficiently the heat generated by photothermal conversion to the surrounding polymer and the like.

The specific surface area is preferably at least 250 and particularly preferably at least 500 m$^2$/g. The DBP number is preferably at least 200 and particularly preferably at least 250 ml/100 g. The carbon black may be an acidic or basic carbon black. The carbon black is preferably a basic carbon black. A mixture containing a different kind of binders may be also used.

An adequate conductive carbon black that has a specific surface area of up to about 1500 m$^2$/g and a DBP number of up to about 550 ml/100 g is commercially available as "KETJENBLACK (registered trade mark) EC300J" and "KETJENBLACK (registered trade mark) EC600J" (available from Akzo Corp.); "PRINREX (registered trade mark) XE" (available from Degussa Corp.); "BLACK PEARLS (registered trade mark) 2000 (available from Cabot Corp.); and "KETJENBLACK" (manufactured by Lion Corp.), for example.

The content of the photothermal conversion agent in the resin composition for laser engraving is, although the content considerably changes in accordance with the magnitude of the intrinsic molecular extinction coefficient thereof, in the range of preferably from 0.01% to 20% by mass with respect to the total solid content of the resin composition, more preferably from 0.05% to 10% by mass, and particularly preferably from 0.1% to 5% by mass.

<(E) Polymerization Initiator>

The resin composition for laser engraving of the present invention preferably contains (E) a polymerization initiator.

Polymerization initiators known among the people in the art are usable without any limitation. Specifically, many are described in, for example, Chemical Review, 93, 435 (1993) by Bruce M. Monroe et al.; Journal of Photochemistry and biology A: Chemistry, 73.81 (1993) by R. S. Davidson; "Photoinitiated Polymerization—Theory and Applications": Rapra Review vol. 9, Report, Papra Technology (1998) by J. P. Faussier; Prog. Polym. Sci., 21, 1 (1996) by M. Tsunooka et al; and the like. Further, a group of compounds that cause oxidative or reductive cleavage of bonds are also known, which are described in Topics in Current Chemistry, 156, 59(1990) by F. D. Saeva; Topics in Current Chemistry, 168, 1 (1993) by G. G. Maslak; JACS, 112, 6329 (1990) by H. B. Shuster et al.; JACS, 102, 3298 (1980) by I. D. F. Eaton et al.; and others.

As a preferable specific example of the polymerization initiator, a radical polymerization initiator that generates radicals by light and/or heat energies and initiates and promotes polymerization reaction of polymerizable compounds will be described in detail below, but the present invention is in no way limited by the following description.

In the present invention, preferable radical polymerization initiators may include (a) aromatic ketones, (b) onium salt compounds, (c) organic peroxides, (d) thio compounds, (e) hexaaryl biimidazole compounds, (f) keto-oxime ester compounds, (g) borate compounds, (h) azinium compounds, (i) metallocene compounds, (j) active ester compounds, (k) compounds having a carbon to halogen bond, and (l) azo compounds. Specific examples of (a) to (l) are described below, but the present invention is in no way limited by these examples.

In the present invention, from the viewpoint of providing an improved engraving sensitivity and an adequate relief edge form when applied to a relief forming layer of a relief printing plate precursor, the (c) organic peroxides and the (l) azo compounds are preferable, and the (c) organic peroxides are particularly preferable.

Generally, when hardness is increased so as to improve the relief edge form, engraving sensitivity becomes lowered. However, by using the sulfur-containing multi-functional monomer that is exemplified as a preferable embodiment of the polymerizable compounds and the foregoing preferable polymerization initiator, the edge form may be improved without lowering engraving sensitivity. Presumably, the oxygen atom or nitrogen atom contained in the polymerization initiator interacts with the sulfur atom of the sulfur-containing multi-functional monomer, so that these two components become close to each other in position, whereby the edge form is improved by increasing polymerization degree and hardness. In addition, owing to the low-temperature thermal decomposition property of the sulfur-containing multi-functional monomer, lowering in the sensitivity caused by increasing polymerization degree may be prevented, presumably.

As the (a) aromatic ketones, (b) onium salt compounds, (d) thio compounds, (e) hexaaryl biimidazole compound, (f) keto-oxime ester compounds, (g) borate compounds, (h) azinium compounds, (i) metallocene compounds, (j) active ester compounds, and (k) compounds having a carbon to halogen bond, the compounds described in the paragraphs [0074] to [0118] of JP-A No. 2008-63554 may be preferably used.

As the (c) organic peroxides and (l) azo compounds, the compounds described below are preferable.

(c) Organic Peroxides

The (c) organic peroxides preferably used as the radical polymerization initiator in the present invention may include almost all of organic compounds that have at least one oxygen to oxygen bond in the molecule thereof, but examples thereof may include: methylethylketone peroxide, cyclohexanone peroxide, 3,3,5-trimethylcyclohexanone peroxide, methylcyclohexanone peroxide, acetylacetone peroxide, 1,1-bis(tertiary-butylperoxy)-3,3,5-trimethylcyclohexane, 1,1-bis(tertiary-butylperoxy) cyclohexane, 2,2-bis(tertiary-butylperoxy)butane, tertiary-butyl hydroperoxide, cumene hydroperoxide, diisopropylbenzene hydroperoxide, paramethane hydroperoxide, 2,5-dimethylhexane-2,5-dihydroperoxide, 1,1,3,3-tetramethylbutyl hydroperoxide, ditertiary-butyl peroxide, tertiary-butylcumyl peroxide, dicumyl peroxide, bis(tertiary-butylperoxyisopropyl)benzene, 2,5-dimethyl-2,5-di(tertiary-butylperoxy) hexane, 2,5-xanoyl peroxide, succinic peroxide, benzoyl peroxide, 2,4-dichlorobenzoyl peroxide, meta-toluoyl peroxide, diisopropylperoxy dicarbonate, di-2-ethylhexylperoxy dicarbonate, di-2-ethoxyethylperoxy dicarbonate, dimethoxyisopropylperoxy carbonate, di(3-methyl-3-methoxybutyl)peroxy dicarbonate, tertiary-butylperoxy acetate, tertiary-butylperoxy pivalate, tertiary-butylperoxy neodecanoate, tertiary-butylperoxy octanoate, tertiary-butylperoxy-3,5,5-trimethyl hexanoate, tertiary-butylperoxy laurate, tertiary-carbonate, 3,3',4,4'-tetra-(tertiary-butylperoxycarbonyl)benzophenone, 3,3',4,4'-tetra-(tertiary-amylperoxycarbonyl)benzophenone, 3,3',4,4'-tetra-(tertiary-hexylperoxycarbonyl)benzophenone, 3,3',4,4'-tetra-(tertiary-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, carbonyl di(tertiary-butylperoxy dihydrogen diphthalate), and carbonyl di(tertiary-hexylperoxy dihydrogen diphthalate).

Of these, peroxy esters including 3,3',4,4'-tetra-(tertiary-butylperoxycarbonyl) benzophenone, 3,3',4,4'-tetra-(tertiary-amylperoxycarbonyl)benzophenone, 3,3',4,4'-tetra-(tertiary-hexylperoxycarbonyl)benzophenone, 3,3',4,4'-tetra-(tertiary-octylperoxycarbonyl)benzophenone, 3,3',4,4'-tetra-(cumylperoxycarbonyl)benzophenone, 3,3',4,4'-tetra-(p-isopropylcumylperoxycarbonyl)benzophenone, and di-tertiary-butyldiperoxy isophthalate are preferable.

(l) Azo Compounds

Examples of the (l) azo compounds preferably used as the radical polymerization initiator in the present invention may include: 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyano valeric acid), 2,2'-azobis dimethyl isobutyrate, 2,2'-azobis(2-methylpropione amide oxime), 2,2'-azobis[2-(2-imidazoline-2-il)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azibis(N-butyl-2-methylpropionamide), 2,2'-azobis(N-cyclohexyl-2-methylpropione amide), 2,2'-azobis[N-(2-propenyl)-2-methylpropionamide], and 2,2'-azobis(2,4,4-trimethylpentane).

The polymerization initiator in the present invention may be used as one kind solely or two or more kinds in combination.

The polymerization initiator may be added in an amount of preferably from 0.01% to 10% by mass and more preferably from 0.1% to 3% by mass with respect to the total solid content of the resin composition for laser engraving.

<Other Additives>

The resin composition for laser engraving of the present invention preferably contains a plasticizer. The plasticizer has an action of softening a film formed from the resin composition for laser engraving, and the plasticizer is required to have an adequate compatibility with the binder polymer.

Examples of the plasticizer may include preferably dioctylphthalate, didodecylphthalate, polyethylene glycols, and polypropylene glycols (mono-ol type or di-ol type), and polypropylene glycols (mono-ol type or di-ol type) are preferably used.

In order to improve engraving sensitivity, nitrocellulose or a highly heat-conductive material is preferably added as additives to the resin composition for laser engraving of the present invention. Nitrocellulose generates heat by itself upon laser engraving because nitrocellulose is a self-reacting compound, and it assists thermal decomposition of the binder polymer such as hydrophilic polymers coexisting therein. Thereby, engraving sensitivity is considered to be enhanced.

The highly heat-conductive material is added so as to assist heat conduction. As the heat-conductive material, inorganic compounds such as metal particles and organic compounds such as conductive polymers may be exemplified. As the metal particles, gold fine particles, silver fine particles, and copper fine particles may be exemplified, which have a particle diameter in the order of from micrometers to several nanometers. As the conductive polymers, conjugated polymers are particularly preferable, and specifically polyaniline and polythiophene may be exemplified.

Further, by using a co-sensitizer, the sensitivity at which the resin composition for laser engraving is photo-cured may be still more enhanced.

Still further, a small amount of a heat-polymerization inhibitor is desirably added so as to prevent unnecessary heat-polymerization of the polymerizable compounds during production or storage of the composition.

Colorants such as dyes or pigments may be added for the purpose of coloring the resin composition for laser engraving. Owing to this, characteristics such as visibility of image portions or adaptability for a tester that measures image density may be improved.

Still further, known additives such as fillers may be added for the purpose of improving the properties of cured films made from the resin composition for laser engraving.

Image Forming Material

The image forming material of the present invention has, on a support, an image forming layer made from the resin composition for laser engraving of the present invention.

The image forming material of the present invention is not particularly limited as long as it has a capability of forming images on the image forming layer by laser engraving, and is applicable to a relief printing plate precursor for laser engraving that is described later, a three-dimensional shaped article, a seal, a mask layer for ablation, an intaglio printing plate, and the like.

Relief Printing Plate Precursor for Laser Engraving

The relief printing plate precursor for laser engraving of the present invention has a relief forming layer comprising the resin composition for laser engraving of the present invention. The relief forming layer is preferably formed on a support.

In the present invention, the "relief printing plate precursor for laser engraving" may be the one in which a crosslinkable relief forming layer comprising the resin composition for laser engraving formed on a support has been cured by light or heat. A "relief printing plate" may be produced by laser engraving the printing plate precursor.

The relief printing plate precursor for laser engraving may have, optionally, an adhesive layer between the support and the relief forming layer, and further may have a slip coating layer or a protective film on the relief forming layer.

<Relief Forming Layer>

The relief forming layer is a layer comprising the resin composition for laser engraving of the present invention, and is preferably a layer that is cured by at least light or heat, that is, a crosslinkable layer.

A preferable embodiment of preparing a relief printing plate from the relief printing plate precursor of the present invention includes: crosslinking a relief forming layer; and then forming a relief layer by laser engraving to obtain a relief printing plate. By crosslinking the relief forming layer, the resulting relief layer can be prevented from being abraded upon printing, and a relief printing plate having a relief layer with sharp patterns is obtainable after laser engraving.

Note that, the relief forming layer may be formed by molding a coating liquid composition for forming a relief forming layer into a sheet or sleeve shape.

<Support>

A support usable for a relief printing plate precursor for laser engraving is described.

The material used for the support of a relief printing plate precursor for laser engraving is not particularly limited, but a material having a high dimensional stability is preferably used. Examples of the material may include: metal such as steel, stainless steel or aluminum; plastic resin such as polyester (PET, PBT or PAN, for example) or polyvinylchloride; synthetic rubber such as styrene-butadiene rubber; and a plastic resin (epoxy resins, phenol resins, or the like) reinforced with glass fibers. As the support, a PET (polyethylene terephthalate) film or a steel substrate is preferably used. The shape of the support is determined considering whether the relief forming layer is formed in a sheet shape or in a sleeve shape.

<Adhesive Layer>

Between the relief forming layer and the support, an adhesive layer may be formed in order to increase the adhesion force between these two layers.

Any material is usable for the adhesive layer as long as the material increases the adhesion force after the relief forming layer is crosslinked. Preferably, the adhesion force is also high even before the relief forming layer is crosslinked. Here, the adhesion force means both ones between the support and the adhesive layer and between the adhesive layer and the relief forming layer.

The adhesion force between the support and the adhesive layer is preferably at least 1.0 N/cm in terms of a peeling force per 1 cm width of a test sample or the layers cannot be peeled off and preferably at least 3.0 N/cm or the layers cannot be peeled off, when the adhesive layer and the relief forming layer are peeled off from a laminate composed of a support, an adhesive layer and a relief forming layer at a speed of 400 mm/minute.

The adhesion force between the adhesive layer and the relief forming layer is preferably at least 1.0 N/cm in terms of a peeling force per 1 cm width of a test sample or the adhesive layer cannot be peeled off and preferably at least 3.0 N/cm or the adhesive layer cannot be peeled off, when the adhesive layer is peeled off from a laminate composed of an adhesive layer and a relief forming layer at a speed of 400 mm/minute.

As the material (adhesive) usable for the adhesive layer, a material described in "Handbook of Adhesives" edited by I. Skeist, 2nd edition (1977) is usable.

<Protective Film and Slip Coating Layer>

The relief forming layer becomes a portion (relief layer) in which a relief is formed after laser engraving, and the surface of the relief layer serves as an ink receiving portion. The relief forming layer after being crosslinked is reinforced by crosslinking, so that scars or dents that bring about adverse effects on printing are hardly developed on the surface of the relief forming layer. However, the relief forming layer before being crosslinked lacks strength in many cases, so that scars and dents are easily developed on the surface thereof. Considering this, for the purpose of preventing scars and dents from being developed on the surface of the relief forming layer, a protective film may be applied to the surface of the relief forming layer.

The protective film does not effectively prevent scars and dents when it is too thin, on the other hand, when too thick, handling becomes difficult and the cost also becomes high. Therefore, the thickness of the protective film is preferably from 25 μm to 500 μm and more preferably from 50 μm to 200 μm.

As the protective film, known materials for use in protective films of printing plates may be used, which include a polyester film such as PET (polyethylene terephthalate) or a polyolefin film such as PE (polyethylene) or PP (polypropylene), for example. The surface of the film may be plane or may be matted.

When the protective film is applied onto the relief forming layer, the protective film is required to be peelable.

When the protective film is unpeelable or, to the contrary, difficult to adhere to the relief forming layer, a slip coating layer may be formed between these two layers.

A material used for the slip coating layer preferably contains, as a primary ingredient, a water-soluble or dispersible, less adhesive resin such as polyvinylalcohol, polyvinylacetate, partially saponified polyvinylalcohol, hydroxyalkylcellulose, alkylcellulose, or polyamide resin. Among these, considering adhesiveness, a partially saponified polyvinylalcohol having a saponification degree of from 60 mol % to 99 mol % and hydroxyalkyl cellulose and alkylcellulose with an alkyl group having from 1 to 5 carbon atoms are particularly preferably used.

When the protective film is peeled off from a laminate composed of a relief forming layer (and a slip coating layer) and a protective film at a speed of 200 mm/minute, the peeling force is preferably from 5 mN/cm to 200 mN/cm per 1 cm and more preferably from 10 mN/cm to 150 mN/cm. When 5 mN/cm or more, the laminate can be handled while the protective film is kept unpeeled. At a peeling force of 200 mN/cm or less, the protective film may be peeled off without any difficulty.

Method of Preparing Relief Printing Plate Precursor for Laser Engraving

Next, a method of preparing a relief printing plate precursor for laser engraving is described.

There is not any particular limitation on the preparation of the relief forming layer in the relief printing plate precursor for laser engraving, but there may be mentioned a method in which a coating liquid composition for forming a relief forming layer is prepared, and melt extruded onto a support after solvent is removed from the coating liquid composition. In another method, the coating liquid composition for forming a relief forming layer may be cast on a support, which is then dried in an oven so as to remove solvent from the coating liquid composition.

After that, if necessary, a protective film may be applied onto the relief forming layer by lamination. Lamination may be carried out by press bonding the protective film and the relief forming layer by a heated calendar roll or the like, or by allowing the protective film to adhere firmly onto the relief forming layer that has a small amount of solvent impregnated in the surface thereof.

When the protective film is used, a method in which the relief forming layer is layered on the protective film at first, then the support is laminated thereon may be employed.

When the adhesive layer is applied, a support having an adhesive layer coated thereon may be used. When the slip coating layer is applied, a protective film having a slip coating layer coated thereon may be used.

The coating liquid composition for forming a relief forming layer may be produced by dissolving the binder polymer and optional components including the photothermal conversion agent and the plasticizer in an appropriate solvent, and then dissolving the polymerizable compounds and the polymerization initiator therein.

Almost all of the solvent is required to be removed in the process of producing the relief printing plate precursor, and thus low molecular volatile alcohols (for example, methanol, ethanol, n-propanol, isopropanol, or propyleneglycol monomethylether) are used as the solvent, and the total addition amount of the solvent is suppressed preferably as small as possible. The addition amount of the solvent may be suppressed by keeping the preparation system at high temperature, but the polymerizable compounds become easy to polymerize when the temperature becomes too high. Therefore, after the polymerizable compounds and/or the polymerization initiator are added, the preparation temperature of the coating liquid composition is kept to be preferably from 30° C. to 80° C.

Here, in the present invention, the relief printing plate precursor for laser engraving is in the state in which the relief forming layer is uncrosslinked or crosslinked. The method of crosslinking the relief forming layer may include preferably a step (step (1) described layer in the method of producing a relief printing plate according to the present invention) of crosslinking the relief forming layer by irradiation of active light and/or heating.

The thickness of the relief forming layer in the relief printing plate precursor for laser engraving is, before and after crosslinking, preferably from 0.05 mm to 10 mm, more preferably from 0.05 mm to 7 mm, and particularly preferably from 0.05 mm to 3 mm.

Relief Printing Plate and Production Thereof

The method of producing a relief printing plate of the present invention includes: (1) a step (hereinafter, referred to as "step (1)" appropriately) of crosslinking an uncrosslinked relief forming layer in the relief printing plate precursor for laser engraving of the present invention by irradiation of active light and/or heating; and (2) a step (hereinafter, referred to as "step (2)" appropriately) of laser engraving the crosslinked relief forming layer to obtain a relief layer. The method of producing a relief printing plate of the present invention enables the production of the relief printing plate of the present invention that has a relief layer on a support.

<Step (1)>

The relief printing plate precursor for laser engraving of the present invention may have, as described above, a relief forming layer cured by crosslinking. In order to obtain the relief forming layer, it is preferable to use a step of crosslinking the uncrosslinked relief forming layer in the relief printing plate precursor for laser engraving by irradiation of active light and/or heating.

The meaning of the term "crosslinking" used in the present invention includes a crosslinking reaction through which binder polymers are linked together and also includes a curing reaction of a relief forming layer caused by a polymerization reaction among polymerizable compounds having an ethylenic unsaturated bond or a reaction between binder polymers and polymerizable compounds.

As described above, in step (1), an uncrosslinked relief forming layer is crosslinked by irradiation of active light and/or heating.

In step (1), when a process of crosslinking by light and a process of crosslinking by heat are used in combination, these processes may be performed simultaneously or separately.

Step (1) is the one in which a relief forming layer of a relief printing plate precursor for laser engraving is crosslinked by at least light or heat.

The relief forming layer contains preferably a polymerizable compound, a binder polymer, a photothermal conversion agent, and a polymerization initiator. Step (1) is the one in which the polymerizable compound is polymerized by an action of the polymerization initiator so as to form crosslinking.

The polymerization initiator is preferably a radical generating agent. The radical generating agent is roughly classified into a photo-polymerization initiator and a heat-polymerization initiator depending on whether radical generation is initiated by light or heat.

When the relief forming layer contains the photo-polymerization initiator, active light that serves as a trigger for the photo-polymerization initiator is irradiated on the relief forming layer so as to crosslink the relief forming layer (a process of crosslinking by light).

Active light is irradiated usually on the entire face of the relief forming layer. Examples of active light may include visible light, UV-light, and electron beam, but UV-light is most popular. When the side of the relief forming layer facing to the support is regarded as the rear face thereof, it is enough that active light is irradiated only on the front face thereof, but it is preferable that active light is also irradiated from the rear face when the support is a transparent film that transmits the active light. When a protective film is put on the front face, the front face may be irradiated through the protective film or after the protective film is removed. In the presence of oxygen, polymerization is possibly inhibited, so that active light may be irradiated after the relief forming layer is covered with a vinyl chloride sheet and evacuated.

When the relief forming layer contains the heat-polymerization initiator (the photo-polymerization initiator described above may also serve as the heat-polymerization initiator), the relief forming layer may be crosslinked by heating the relief printing plate precursor for laser engraving (a process of crosslinking by heat). As a heating method, a method of heating the printing plate precursor in a hot-air oven or a near infrared oven for a predetermined time and a method of contacting with a heated roll for a predetermined time may be used.

When step (1) is the process of crosslinking by light, an apparatus irradiating active light is relatively expensive, but the printing plate precursor is hardly exposed to high temperature, so that the printing plate precursor has practically no limitations on the raw materials thereof.

When step (1) is the process of crosslinking by heat, an advantage of not requiring an extra expensive apparatus is expected, but the printing plate precursor is exposed to high temperature. The raw material used herein are required to be carefully selected, for example, considering that a thermoplastic polymer that becomes soft at high temperature is possibly deformed during heating.

Upon crosslinking by heat, a heat-polymerization initiator may be added. As the heat-polymerization initiator, commercial heat-polymerization initiators for use in free radical polymerization may be used. Examples of the heat-polymerization initiators may include an appropriate peroxide and a compound having a hydroperoxide or azo group. A typical vulcanizing agent may be used for crosslinking. A heat-crosslinkable (heat-curable) resin, for example an epoxy resin, may be added to the layer as a crosslinkable component, thereby enabling also heat-crosslinking.

As a method of crosslinking the relief forming layer in step (1), the process of crosslinking by heat is preferable considering that the relief forming layer is curable (crosslinkable) uniformly from the surface to inside.

By crosslinking the relief forming layer, the following advantages are expected: a first one is that the relief formed after laser engraving becomes sharp; and a second one is that adhesiveness of scraps produced by laser engraving is suppressed. When un-crosslinked relief forming layer is subjected to laser engraving, unintended portions are easy to melt and deform by remaining heat that is conducted to the peripheries of a laser irradiated portion, thereby not providing a sharp relief layer in some cases. As a general property of material, a lower molecular material is not in a solid form but in a liquid form, namely, likely to have a stronger adhesiveness. The engraving scraps produced when the relief forming layer is engraved are likely to have a stronger adhesiveness, when a larger amount of a lower molecular material is used. The polymerizable compound that is low molecular is changed into a high molecular compound by crosslinking, so that engraving scraps are likely to have a reduced adhesiveness.

<Step (2)>

In the method of producing a relief printing plate of the present invention, after step (1), (2) a step of forming a relief layer by laser engraving a crosslinked relief forming layer is performed. The method of producing a relief printing plate of the present invention enables the production of the relief printing plate of the present invention having a relief layer on a support.

In the method of producing a relief printing plate of the present invention, after step (2), if necessary, steps (3) to (5) may be included.

Step (3): a step of rinsing the surface of a relief layer after engraving, that is the engraved surface, with water or a liquid containing water as a primary ingredient (rinsing step).

Step (4): a step of drying the engraved relief layer (drying step).

Step (5): a step of further crosslinking the relief layer by applying energy to the relief layer after engraving (post crosslinking step).

Step (2) is a step of forming a relief layer by laser engraving a relief forming layer that is crosslinked in step (1). Specifically, a relief layer is formed by engraving with a laser beam that corresponds to an image to be formed and is irradiated on a crosslinked relief forming layer. Preferably, there may be mentioned a process in which scanning irradiation is carried out with respect to the relief forming layer by controlling a laser head by a computer based on digital data of the image to be formed.

In step (2), an infrared laser is preferably used. When the infrared laser is irradiated, the molecules contained in the relief forming layer cause molecular vibration, and heat is generated. When a high power laser such as a carbon dioxide gas laser or a YAG laser is used as the infrared laser, a large amount of heat is generated at a laser irradiated portion and the molecules contained in the relief forming layer are broken or ionized and selectively removed, that is, engraving is done. The advantage of laser engraving is a three-dimensional structural control because engraving depth can be selected arbitrarily. For example, a portion where fine halftone dots are printed may be engraved shallowly or with shoulders, so that the relief is prevented from falling down by an action of printing pressure; and a grooved portion where fine outline characters are printed may be engraved deeply, so that the groove is not easily filled with ink and that outline characters may be prevented from being collapsed.

In particular, when an infrared laser that corresponds to the absorption wavelength of a photothermal conversion agent is used for engraving, the relief layer may be removed selectively with a still higher sensitivity and a relief layer with sharp images is obtained. As the infrared laser used in step (2), from the viewpoint of productivity, cost-effectiveness and the like, a carbon dioxide gas laser or a semiconductor laser is preferable. In particular, a semiconductor infrared laser with a fiber is preferably used.

When engraving scraps are stuck to the engraved face, step (3) of removing the engraving scraps may be carried out, in which the engraved face is rinsed with water or a liquid containing water as a primary ingredient. Examples of the method of rinsing may include: a method of washing with tap water; a method of spraying high pressure water; and a method of brushing the engraved face in the presence of water with a batch-wise or continuous brushing machine that is known as a developing machine for a relief printing plate of photosensitive resin. When the slime of engraving scraps is not removed, a rinsing liquid with a surfactant added thereto may be used.

When step (3) of rinsing the engraved face is performed, step (4) of drying the engraved relief forming layer to vaporize the rinsing liquid may be preferably additionally performed.

Further, if necessary, step (5) of further crosslinking the relief forming layer may be additionally performed. By step (5) of additional crosslinking, the relief formed by engraving may become still stronger.

In this way, the relief printing plate of the present invention having a relief layer on a support is obtained.

The thickness of the relief layer in the relief printing plate is, considering satisfying various adaptabilities for flexo printing such as abrasion resistance or ink transferring performance, preferably from 0.05 mm to 10 mm, more preferably from 0.05 mm to 7 mm, and particularly preferably from 0.05 mm to 0.3 mm.

The shore A hardness of the relief layer in the relief printing plate is preferably from 50° to 90°.

When the shore A hardness is 50° or more, fine halftone dots formed by engraving hardly fall down and collapse even though they receive a strong printing pressure from a relief printing machine, so that printing may be performed adequately. On the other hand, when the shore A hardness of the relief layer is 90° or less, thin or faded printing may be prevented at solid portions even in the flexo printing with a kiss-touch printing pressure.

The shore A hardness described herein is evaluated with a durometer (spring type rubber hardness tester) as follows: a depressor (called a stylus or indenter) is pushed onto the surface of an object to be measured so as to deform it; and then the amount of deformation (pushed depth) is measured and numerically quantified.

The relief printing plate produced in accordance with the method of the present invention allows printing with an oil-based ink or a UV ink using a relief printing machine, and also allows printing with a UV ink using a flexo printing machine.

According to the invention, for example, the following embodiments <1> to <21> are provided.

<1> A resin composition for laser engraving, comprising:
(A) a binder polymer; and
(B) a metal compound containing a metal selected from the group consisting of metals in Group 1 to Group 15 in the periodic table.

<2> The resin composition for laser engraving according to <1>, wherein the (A) binder polymer is at least one selected from the group consisting of a vinyl polymer, a polyamide, a polyurethane, and a polyurea.

<3> The resin composition for laser engraving according to <1> or <2>, wherein the (A) binder polymer is a vinyl polymer.

<4> The resin composition for laser engraving according to any one of <1> to <3>, wherein the (A) binder polymer is a vinyl polymer and is soluble in water and/or ethanol.

<5> The resin composition for laser engraving according to any one of <1> to <4>, wherein the (B) metal compound contains at least one metal selected from the group consisting of metals in Group 1, Group 2, Group 4, Group 12, Group 13, Group 14, and Group 15 in the periodic table.

<6> The resin composition for laser engraving according to any one of <1> to <4>, wherein the (B) metal compound contains at least one metal selected from the group consisting of Na, K, Ca, Mg, Ti, Zr, Al, Zn, Sn, and Bi.

<7> The resin composition for laser engraving according to any one of <1> to <4>, wherein the (B) metal compound is at least one selected from the group consisting of an oxide, a sulfide, a halide, a carbonate, a carboxylate, a sulfonate, a phosphate, a nitrate, a sulfate, an alkoxide, a hydroxide, and an acetylacetonate complex that may have a substituent group.

<8> The resin composition for laser engraving according to any one of <1> to <4>, wherein the (B) metal compound is at least one selected from the group consisting of a halide, a carboxylate, a nitrate, a sulfate, a hydroxide, and an acetylacetonate complex that may have a substituent group.

<9> The resin composition for laser engraving according to any one of <1> to <4>, wherein
the (B) metal compound contains at least one metal selected from the group consisting of metals in Group 1, Group 2, Group 4, Group 12, Group 13, Group 14, and Group 15 in the periodic table, and
the (B) metal compound is an oxide, sulfide, halide, carbonate, carboxylate, sulfonate, phosphate, nitrate, sulfate, alkoxide, hydroxide, or acetylacetonate complex of the at least one metal, wherein the acetylacetonate complex may have a substituent group.

<10> The resin composition for laser engraving according to any one of <1> to <4>, wherein
the (B) metal compound contains at least one metal selected from the group consisting of Na, K, Ca, Mg, Ti, Zr, Al, Zn, Sn, and Bi, and
the (B) metal compound is an oxide, sulfide, halide, carbonate, carboxylate, sulfonate, phosphate, nitrate, sulfate, alkoxide, hydroxide, or acetylacetonate complex of the at least one metal, wherein the acetylacetonate complex may have a substituent group.

<11> The resin composition for laser engraving according to any one of <1> to <4>, wherein
the (B) metal compound contains at least one metal selected from the group consisting of metals in Group 1, Group 2, Group 4, Group 12, Group 13, Group 14, and Group 15 in the periodic table, and the (B) metal compound is a halide, carboxylate, nitrate, sulfate, hydroxide, or acetylacetonate complex of the at least one metal, wherein the acetylacetonate complex may have a substituent group.

<12> The resin composition for laser engraving according to any one of <1> to <4>, wherein the (B) metal compound contains at least one metal selected from the group consisting of Na, K, Ca, Mg, Ti, Zr, Al, Zn, Sn, and Bi, and the (B) metal compound is a halide, carboxylate, nitrate, sulfate, hydroxide, or acetylacetonate complex of the at least one metal, wherein the acetylacetonate complex may have a substituent group.

<13> The resin composition for laser engraving according to any one of <1> to <12>, which is curable by at least light or heat.

<14> The resin composition for laser engraving according to any one of <1> to <12>, which is curable by heat.

<15> An image forming material comprising an image forming layer comprising the resin composition for laser engraving according to any one of <1> to <14> on a support.

<16> A relief printing plate precursor for laser engraving comprising a relief forming layer comprising the resin composition for laser engraving according to any one of <1> to <14>.

<17> A method of producing a relief printing plate, comprising:

crosslinking the relief forming layer in the relief printing plate precursor for laser engraving according to <16> by at least light or heat, and laser engraving the crosslinked relief forming layer to form a relief layer.

<18> The method of producing a reliefprinting plate according to <17>, wherein the crosslinking is crosslinking of the relief forming layer by heat.

<19> A relief printing plate comprising a relief layer, which is produced by the method of producing a relief printing plate according to <17> or <18>.

<20> The relief printing plate according to <19>, wherein the thickness of the relief layer is from 0.05 mm to 10 mm.

<21> The relief printing plate according to <19> or <20>, wherein the shore A hardness of the relief layer is from 500 to 90°.

According to the present invention, a resin composition for laser engraving having a high engraving sensitivity when it is applied to laser engraving is provided.

Further, according to the present invention, an image forming material that has a high engraving sensitivity and is capable of forming an image by laser engraving is provided.

Still further, according to the present invention, a relief printing plate precursor for laser engraving that has a high engraving sensitivity and is capable of forming a printing plate directly by laser engraving, a method of producing a relief printing plate using the relief printing plate precursor, and a relief printing plate obtained by the method are provided.

EXAMPLES

The present invention will be further described in detail with reference to the following examples, but it should be construed that the invention is in no way limited by those examples.

<Solubility of Binder Polymer in Water and Ethanol>

A powdery or pelletized binder polymer in an amount of 0.1 g and water in an amount of 2 mL or ethanol in an amount of 2 mL were mixed, closed with a lid, and allowed to stand at room temperature for 24 hours. After that, solubility was evaluated by visual observation.

The following criteria were used for the evaluation.

A (soluble): No precipitation of the polymer is found, and the solution (dispersion liquid) is transparent and uniform.

B (insoluble): Precipitation of the polymer is found, or the solution (dispersion liquid) is turbid.

The evaluation results are shown in the following Table 1.

TABLE 1

| (A) Binder polymer | Solubility in water | Solubility in ethanol |
|---|---|---|
| PVA (GOSENAL T-215) | A | B |
| Polyvinyl butyral (#3000-2), Mw: 90,000 | B | A |
| Polyamide (AMILAN CM4000) | B | A |
| Polyurethane (LEZAMIN ME8105) | B | B |
| Polyvinylacetate, Mw: 100,000 | B | B |
| Polyurea (PU1), Mw: 100,000 | B | B |
| Polylactic acid (LANDY PL-2000) | B | B |
| POLYETHYLENE GLYCOL 20,000 | A | A |

Example A1

1. Preparation of Resin Composition for Laser Engraving

In a three-necked flask with an stirring blade and a condenser tube, 5 g of zinc chloride (manufactured by Kanto Chemical Co., Inc.) as the (B) metal compound, 40 g of "GOSENAL T-215" (trade name, manufactured by Nippon Synthetic Chemical Industry Co., Ltd., PVA derivative) as the (A) binder polymer, 0.75 g of "KETJENBLACK EC600 JD" (trade name, manufactured by Lion Corp.) as a photothermal conversion agent, 20 g of diethylene glycol as a plasticizer, and 35 g of water and 12 g of ethanol as a solvent were charged, and heated at 70° C. for 2 hours with stirring to dissolve the polymer. Further, as polymerizable compounds, "BLENMER PDE-200" (trade name, manufactured by NOF Corp.), "BLENMER PME-200" (trade name, manufactured by NOF Corp.), and methacrylic acid (manufactured by Wako Pure Chemical Industries, Ltd.) in an amount of 15 g, 13 g, and 5 g respectively; as a polymerization initiator "PERBUTYL Z" (trade name, manufactured by NOF Corp.) in an amount of 1.6 g; and, as an additive, "PERBUTYL H-69" (trade name, manufactured by NOF Corp.) in an amount of 7.2 g were added. The resulting mixture was stirred for 30 minutes to obtain a resin composition for laser engraving (coating liquid composition for forming a relief forming layer) with fluidity.

2. Preparation of Relief Printing Plate Precursor for Laser Engraving

A spacer (frame) with a predetermined thickness was placed on a PET substrate; the above obtained resin composition for laser engraving was cast carefully to an extent that the composition did not flow over the frame; and the composition was dried in an over at 70° C. for 3 hours to obtain a relief forming layer with a thickness of about 1 mm.

The resulting relief forming layer was heated at 100° C. for 3 hours so as to be crosslinked. In this way, a relief printing plate precursor for laser engraving was obtained.

3. Preparation of Relief Printing Plate

The relief forming layer after being crosslinked was engraved with a near infrared laser engraving machine of "FD-100" (trade name, manufactured by Tosei Electrobeam Co., Ltd.) equipped with a semiconductor laser having a maximum power of 16 W (laser oscillation wavelength was 840 nm) under the engraving conditions: 15 W of laser power; 100 mm/second of scan speed; 0.15 mm of pitch interval; and 2 cm square of a solid portion was engraved to form a relief layer. In this way, a relief printing plate A1 was obtained.

The thickness and shore A hardness of the relief layer in the relief printing plate A1 were measured. The results are shown in the following Table 2. The shore A hardness of the relief layer was measured in accordance with the measurement method described above. In each example and comparative example described later, the shore A hardness was also measured similarly.

Examples A2 to A7

Relief printing plate precursors for laser engraving were prepared similarly to Example A1, except that "GOSENAL T-215" used in Example A1 was replaced by "#3000-2" (trade name, polyvinyl butyral, manufactured by DENKI KAGAKU KOGYO KABUSHIKI KAISHA) in Example A2; "AMILAN CM4000 (trade name, polyamine, manufactured by Toray Industries, Inc.) in Example 3A; "LEZAMIN ME8105LP (trade name, polyurethane, manufactured by Dainichiseika Color & Chemicals Mfg. Co., Ltd.) in Example A4; polyvinyl acetate (manufactured by Alfa Aesar Corp.) in Example 5A; polyurea (PU1) in Example A6; and "TR2000" (trade name, styrene and butadiene thermoplastic elastomer, manufactured by JSR Corp.) in Example A7, respectively, and in Examples A2 and A3, water was replaced by ethanol, and in Examples A4 to A7, water was replaced by methylethylketone. Then, relief printing plates A2 to A7 were prepared from the relief printing plate precursors for laser engraving.

Note that, the polyurea (PU1) used in Example A6 was synthesized from tolylene diisocyanate and 1,6-hexanediamine.

The thickness and shore A hardness of the relief layers in the resulting relief printing plates A2 to A7 are shown in the following Table 2.

Example A8

A relief printing plate precursor for laser engraving was prepared similarly to Example A1, except that 10 g of "LANDY PL-2000" (trade name, manufactured by MIYOSHI OIL&FAT CO., LTD.) were added when preparing the resin composition for laser engraving. Then, a relief printing plate A8 was prepared from the relief printing plate precursor for laser engraving.

The thickness and shore A hardness of the relief layer in the resulting relief printing plate A8 are shown in the following Table 2.

Examples A9 to A16 and Comparative Examples A1 and A2

Relief printing plate precursors for laser engraving were prepared similarly to Example A1, except that "zinc chloride" used in Example A1 was replaced by zinc nitrate hexahydrate (manufactured by Kanto Chemical Co., Inc.) in Example A9; zinc oxide (manufactured by Kanto Chemical Co., Inc.) in Example A10; zinc sulfide (manufactured by Kanto Chemical Co., Inc.) in Example A11; tin 2-ethylhexanoate (manufactured by Wako Pure Chemical Industries, Ltd.) in Example A12; calcium chloride (manufactured by Kanto Chemical Co., Inc.) in Example A13; copper chloride dihydrate (manufactured by Kanto Chemical Co., Inc.) in Example A14; nickel chloride hexahydrate (manufactured by Kanto Chemical Co., Inc.) in Example A15; bis(2,4-pentanedionato)magnesium in Example 16A; no addition in Comparative Example A1; silica gel (manufactured by Kanto Chemical Co., Inc.) in Comparative Example A2, respectively. Then, relief printing plates A9 to A16, AC1, and AC2 were prepared from the relief printing plate precursors for laser engraving.

The thickness and shore A hardness of the relief layers in the resulting relief printing plates A9 to A16, AC1 and AC2 are shown in the following Table 2.

Comparative Examples A3 to A8

Relief printing plate precursors for laser engraving were prepared similarly to Examples A2 to A7 respectively, except that "zinc chloride" in Examples A2 to A7 was not added when preparing the resin composition for laser engraving. Then relief printing plates AC3 to AC8 were prepared from the relief printing plate precursors for laser engraving.

The thickness and shore A hardness of the relief layers in the resulting relief printing plates AC3 to AC8 are shown in the following Table 2.

Examples A17 to A19

Relief printing plate precursors for laser engraving were prepared similarly to Example A2, except that "zinc chloride" used in Example A2 was replaced by zinc nitrate hexahydrate (manufactured by Kanto Chemical Co., Inc.) in Example A17; calcium chloride (manufactured by Kanto Chemical Co., Inc.) in Example A18; nickel chloride hexahydrate (manufactured by Kanto Chemical Co., Inc.) in Example A19, respectively. Then, relief printing plates A17 to A19 were prepared from the relief printing plate precursors for laser engraving.

The thickness and shore A hardness of the relief layers in the resulting relief printing plates A17 to A19 are shown in the following Table 2.

Examples A20 to A22

Relief printing plate precursors for laser engraving were prepared similarly to Example A1, except that the amount of zinc chloride used in Example A1 was changed from 5 g to 1 g in Example A20, 3 g in Example A21, and 10 g in Example A22, respectively. Then, relief printing plates A20 to A22 were prepared from the relief printing plate precursors for laser engraving.

The thickness and shore A hardness of the relief layers in the resulting relief printing plates A20 to A22 are shown in the following Table 2.

Example A23

A relief printing plate precursor for laser engraving was prepared similarly to Example A1, except that "BLENMER PDE200" used in Example A1 was replaced by the following monomer M1. Then, a relief printing plate A23 was prepared from the relief printing plate precursor for laser engraving.

The thickness and shore A hardness of the relief layer in the resulting relief printing plate A23 are shown in the following Table 2.

M1

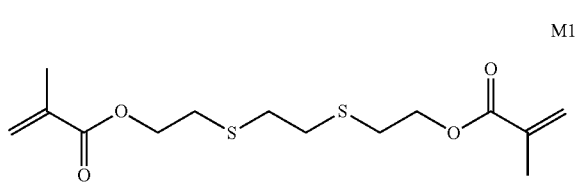 [SMILES: C=C(C)C(=O)OCCSCCSCCOC(=O)C(=C)C]

Example A24

A relief printing plate precursor for laser engraving was prepared similarly to Example A2, except that "BLENMER PDE200" used in Example A2 was replaced by the above monomer M1. Then, a relief printing plate A24 was prepared from the relief printing plate precursor for laser engraving.

The thickness and shore A hardness of the relief layer in the resulting relief printing plate A24 are shown in the following Table 2.

Example A25

A relief printing plate precursor for laser engraving was prepared similarly to Example A1, except that the "carbon black" used in Example A1 was replaced by "ADS820HO" (trade name, cyanine compound, manufactured by American Dye Source, Inc.). Then, a relief printing plate A25 was prepared from the relief printing plate precursor for laser engraving.

The thickness and shore A hardness of the relief layer in the resulting relief printing plate A25 are shown in the following Table 2.

Example A26

A relief printing plate precursor for laser engraving was prepared similarly to Example A1, except that the "carbon black" used in Example A1 was replaced by "D99-009" (trade name, phthalocyanine, manufactured by Yamamoto Chemicals Inc.). Then, a relief printing plate A26 was prepared from the relief printing plate precursor for laser engraving.

The thickness and shore A hardness of the relief layer in the resulting relief printing plate A26 are shown in the following Table 2.

Example A27

A relief printing plate precursor for laser engraving was prepared similarly to Example A1, except that "PERBUTYL Z" used in Example A1 was replaced by "V-30" (trade name, azo initiator, manufactured by Wako Pure Chemical Industries, Ltd.). Then, a relief printing plate A27 was prepared from the relief printing plate precursor for laser engraving.

The thickness and shore A hardness of the relief layer in the resulting relief printing plate A27 are shown in the following Table 2.

Example A28

A relief printing plate precursor for laser engraving was prepared similarly to Example A1, except that "GOSENAL T-215" used in Example A1 was replaced by "POLYETHYLENE GLYCOL 20,000" (trade name, manufactured by Wako Pure Chemical Industries, Ltd.). Then, a relief printing plate A28 was prepared from the relief printing plate precursor for laser engraving.

The thickness and shore A hardness of the relief layer in the resulting relief printing plate A28 are shown in the following Table 3.

Examples A29 to A39

Relief printing plate precursors for laser engraving were prepared similarly to Example A1, except that "zinc chloride" used in Example A1 was replaced by sodium 2-ethylhexanoate (manufactured by Alfa Aesar Corp.) in Example A29; a 2-propanol solution dissolving potassium 2-ethylhexanoate in an amount of 40% (manufactured by WAKO CHEMICAL, LTD.) in Example A30; "8% OCTOPE A1" (trade name, manufactured by Hope Chemical Co., LTD.) in Example A31; basic aluminum acetate (manufactured by Wako Pure Chemical Industries, Inc.) in Example A32; aluminum stearate, mono (manufactured by Wako Pure Chemical Industries, Inc.) in Example A33; aluminum stearate, di (manufactured by Wako Pure Chemical Industries, Inc.) in Example A34; aluminum stearate (manufactured by Kanto Chemical Co., Ltd.) in Example A35; aluminum salicylate (manufactured by MP Biomedicals Corp.) in Example A36; aspirin aluminum (manufactured by Wako Pure Chemical Industries, Inc.) in Example A37; tris(2,4-pentanedionato)aluminum (manufactured by Tokyo Chemical Industry Co., Ltd.) in Example A38; and zinc 2-ethylhexanoate (manufacture by Alfa Aesar Corp.) in Example A39, respectively. Then, relief printing plates A29 to A39 were prepared from the relief printing plate precursors for laser engraving.

Note that, in Example A30, in place of 5 g of zinc chloride, 12.5 g of a 2-propanol solution dissolving potassium 2-ethylhexanoate in an amount of 40% were used.

The thickness and shore A hardness of the relief layers in the resulting relief printing plates A29 to A39 are shown in the following Table 3.

Examples A40 to A49

Relief printing plate precursors for laser engraving were prepared similarly to Example A2, except that "zinc chloride" used in Example A2 was replaced by sodium 2-ethylhexanoate (manufactured by Alfa Aesar Corp.) in Example A40; a 2-propanol solution dissolving potassium 2-ethylhexanoate in an amount of 40% (manufactured by WAKO CHEMICAL, LTD.) in Example A41; "8% OCTOPE A1" (trade name, manufactured by Hope Chemical Co., LTD.) in Example 42; basic aluminum acetate (manufactured by Wako Pure Chemical Industries, Inc.) in Example A43; aluminum stearate, mono (manufactured by Wako Pure Chemical Industries, Inc.) in Example 44; aluminum stearate, di (manufactured by Wako Pure Chemical Industries, Inc.) in Example 45; aluminum stearate (manufactured by Kanto Chemical Co., Ltd.) in Example 46; aluminum salicylate (manufactured by MP Biomedicals Corp.) in Example 47; aspirin aluminum (manufactured by Wako Pure Chemical Industries, Inc.) in Example 48; and tris(2,4-pentanedionato)aluminum (manufactured by Tokyo Chemical Industry Co., Ltd.) in Example 49, respectively. Then, relief printing plates A40 to A49 were prepared from the relief printing plate precursors for laser engraving.

Note that, in Example A41, in place of 5 g of zinc chloride, 12.5 g of a 2-propanol solution dissolving potassium 2-ethylhexanoate in an amount of 40% were used.

The thickness and shore A hardness of the relief layers in the resulting relief printing plates A40 to A49 are shown in the following Table 3.

Examples B1 to B49 and Comparative Examples
B1 to B8

Relief printing plates B1 to B49 and BC1 to BC8 were prepared similarly to Examples A1 to A49 and Comparative Examples A1 to A8 respectively, except that the "near infrared laser engraving machine" used for the preparation of relief printing plates in Examples A1 to A49 and Comparative Examples A1 to A8 was replaced by the following "carbon dioxide gas laser engraving machine" and laser engraving was carried out in the following manner.

As the carbon dioxide gas laser engraving machine, "CO$_2$ LASER MARKER ML-Z9500" (trade name, manufactured by KEYENCE CORP.) equipped with a carbon dioxide gas laser having a maximum powder of 30 W was used. Engraving conditions are: 15 W of laser power; 100 mm/second of scan speed; and 0.15 mm of pitch interval. 2 cm square of a solid portion was engraved to obtain a relief printing plate.

The thickness and shore A hardness of the relief layers in the resulting relief printing plates B1 to B49 and BC1 to BC8 are shown in the following Tables 4 and 5.

<Evaluation>

Engraving Depth

The "engraving depth" of the relief layers in the relief printing plates A1 to A49, B1 to B49, AC1 to AC8, and BC1 to BC8 obtained as described above was measured as follows. Here, the "engraving depth" was the difference between the engraved position (in height) and the un-engraved position (in height) that were observed in the cross-section of the relief layer. In Examples of the present invention, the "engraving depth" was measured by observing the cross-section of the relief layer with a "ULTRA-DEPTH COLOR 3D SHAPE MEASURMENT MICROSCOPE VK9510" (trade name, manufactured by KEYENCE CORP.). A large engraving depth means a high engraving sensitivity. The results are shown in the following Tables 2 to 5.

Resistance to UV Ink

The following immersion test was carried out by using an UV ink of "TOKA UV500 AI" (trade name, manufactured by T&K TOKA CO., LTD.) undiluted.

A PET support was peeled off from a relief printing plate precursor having a heat-crosslinked relief forming layer by using the method described above; then 5 g of the relief forming layer with 1 mm thickness were weighed as a test sample. The test sample was immersed in the UV ink at 25° C. of atmospheric temperature for 24 hours, and then taken out to measure the mass thereof after being dried at 100° C. for 5 hours.

When the survival rate after the UV ink immersion is 75% by mass or more, the test sample is considered to have a practically sufficient adaptability to the UV ink. In the case of less than 75% by mass, the test sample is considered to have a practically insufficient adaptability to the UV ink. The results are shown in the following Tables 2 to 5.

Evaluation of Engraving Scrap Removability (Rinsing Property)

The relief printing plates A1 to A49, B1 to B49, AC1 to AC8, and BC1 to BC8 obtained by engraving in each Example and Comparative Example were immersed in water, and the engraved portion was brushed 10 times with a toothbrush (CLINICA TOOTHBRUSH (FLAT), trade name, manufactured by LION Corp.). After that, the surface of the relief layer was observed with an optical microscope as to whether scraps were remained thereon or not.

A test sample with no scraps remained was ranked as A. A test sample with almost no scraps remained was ranked as B. A test sample with a small amount of scraps remained was ranked as C. A test sample in which the scraps were not removed was ranked as D. The results are shown in the following Tables 2 to 5.

TABLE 2

| | Relief printing plate | Relief layer Thickness (mm) | Relief layer Shore A hardness (°) | Laser used for engraving | Engraving depth (μm) | Survival rate after immersion in UV ink (% by mass) | Rinsing property |
|---|---|---|---|---|---|---|---|
| Example A1 | A1 | 1.25 | 75 | Semiconductor laser | 570 | 100 | B |
| Example A2 | A2 | 1.33 | 78 | Semiconductor laser | 570 | 100 | C |
| Example A3 | A3 | 1.32 | 75 | Semiconductor laser | 540 | 100 | C |
| Example A4 | A4 | 1.22 | 72 | Semiconductor laser | 535 | 92 | C |
| Example A5 | A5 | 1.28 | 72 | Semiconductor laser | 520 | 90 | C |
| Example A6 | A6 | 1.24 | 77 | Semiconductor laser | 525 | 86 | C |
| Example A7 | A7 | 1.35 | 74 | Semiconductor laser | 510 | 65 | C |
| Example A8 | A8 | 1.42 | 81 | Semiconductor laser | 595 | 100 | C |
| Example A9 | A9 | 1.36 | 79 | Semiconductor laser | 570 | 100 | B |
| Example A10 | A10 | 1.51 | 84 | Semiconductor laser | 545 | 100 | C |
| Example A11 | A11 | 1.43 | 71 | Semiconductor laser | 510 | 100 | C |
| Example A12 | A12 | 1.19 | 75 | Semiconductor laser | 520 | 100 | B |
| Example A13 | A13 | 1.23 | 81 | Semiconductor laser | 545 | 100 | B |
| Example A14 | A14 | 1.41 | 78 | Semiconductor laser | 520 | 100 | C |
| Example A15 | A15 | 1.54 | 73 | Semiconductor laser | 535 | 100 | C |
| Example A16 | A16 | 1.38 | 81 | Semiconductor laser | 570 | 100 | C |
| Example A17 | A17 | 1.33 | 78 | Semiconductor laser | 570 | 100 | C |
| Example A18 | A18 | 1.36 | 74 | Semiconductor laser | 565 | 100 | C |
| Example A19 | A19 | 1.29 | 81 | Semiconductor laser | 555 | 100 | C |
| Example A20 | A20 | 1.25 | 79 | Semiconductor laser | 555 | 100 | C |
| Example A21 | A21 | 1.32 | 76 | Semiconductor laser | 565 | 100 | B |
| Example A22 | A22 | 1.29 | 71 | Semiconductor laser | 570 | 100 | B |
| Example A23 | A23 | 1.22 | 72 | Semiconductor laser | 565 | 100 | B |
| Example A24 | A24 | 1.42 | 81 | Semiconductor laser | 560 | 100 | C |
| Example A25 | A25 | 1.32 | 75 | Semiconductor laser | 555 | 100 | B |
| Example A26 | A26 | 1.22 | 72 | Semiconductor laser | 565 | 100 | B |
| Example A27 | A27 | 1.42 | 81 | Semiconductor laser | 560 | 100 | B |

TABLE 2-continued

| | Relief layer | | | | Survival rate after | |
| --- | --- | --- | --- | --- | --- | --- |
| | Relief printing plate | Thickness (mm) | Shore A hardness (°) | Laser used for engraving | Engraving depth (μm) | immersion in UV ink (% by mass) | Rinsing property |
| Comparative Example A1 | AC1 | 1.36 | 76 | Semiconductor laser | 440 | 100 | C |
| Comparative Example A2 | AC2 | 1.45 | 79 | Semiconductor laser | 430 | 100 | C |
| Comparative Example A3 | AC3 | 1.33 | 73 | Semiconductor laser | 440 | 100 | D |
| Comparative Example A4 | AC4 | 1.31 | 71 | Semiconductor laser | 420 | 100 | D |
| Comparative Example A5 | AC5 | 1.29 | 81 | Semiconductor laser | 415 | 92 | D |
| Comparative Example A6 | AC6 | 1.36 | 75 | Semiconductor laser | 405 | 90 | D |
| Comparative Example A7 | AC7 | 1.27 | 77 | Semiconductor laser | 410 | 86 | D |
| Comparative Example A8 | AC8 | 1.45 | 79 | Semiconductor laser | 400 | 65 | D |

TABLE 3

| | Relief layer | | | | Survival rate after | |
| --- | --- | --- | --- | --- | --- | --- |
| | Relief printing plate | Thickness (mm) | Shore A hardness (°) | Laser used for engraving | Engraving depth (μm) | immersion in UV ink (% by mass) | Rinsing property |
| Example A28 | A28 | 1.31 | 70 | Semiconductor laser | 515 | 100 | B |
| Example A29 | A29 | 1.35 | 73 | Semiconductor laser | 515 | 100 | A |
| Example A30 | A30 | 1.15 | 68 | Semiconductor laser | 525 | 100 | A |
| Example A31 | A31 | 1.28 | 79 | Semiconductor laser | 595 | 100 | A |
| Example A32 | A32 | 1.19 | 80 | Semiconductor laser | 520 | 100 | B |
| Example A33 | A33 | 1.25 | 76 | Semiconductor laser | 565 | 100 | B |
| Example A34 | A34 | 1.29 | 73 | Semiconductor laser | 560 | 100 | A |
| Example A35 | A35 | 1.15 | 81 | Semiconductor laser | 545 | 100 | A |
| Example A36 | A36 | 1.22 | 81 | Semiconductor laser | 530 | 100 | B |
| Example A37 | A37 | 1.29 | 76 | Semiconductor laser | 535 | 100 | B |
| Example A37 | A38 | 1.24 | 79 | Semiconductor laser | 520 | 100 | B |
| Example A39 | A39 | 1.31 | 71 | Semiconductor laser | 545 | 100 | A |
| Example A40 | A40 | 1.33 | 71 | Semiconductor laser | 525 | 100 | A |
| Example A41 | A41 | 1.18 | 70 | Semiconductor laser | 535 | 100 | A |
| Example A42 | A42 | 1.29 | 77 | Semiconductor laser | 600 | 100 | A |
| Example A43 | A43 | 1.18 | 82 | Semiconductor laser | 530 | 100 | B |
| Example A44 | A44 | 1.21 | 79 | Semiconductor laser | 575 | 100 | B |
| Example A45 | A45 | 1.31 | 71 | Semiconductor laser | 570 | 100 | A |
| Example A46 | A46 | 1.14 | 83 | Semiconductor laser | 555 | 100 | A |
| Example A47 | A47 | 1.26 | 79 | Semiconductor laser | 540 | 100 | B |
| Example A48 | A48 | 1.31 | 78 | Semiconductor laser | 545 | 100 | B |
| Example A49 | A49 | 1.21 | 81 | Semiconductor laser | 530 | 100 | B |

TABLE 4

| | Relief layer | | | | Survival rate after immersion | |
| --- | --- | --- | --- | --- | --- | --- |
| | Relief printing plate | Thickness (mm) | Shore A hardness (°) | Laser used for engraving | Engraving depth (μm) | in UV ink (% by mass) | Rinsing property |
| Example B1 | B1 | 1.25 | 75 | Carbon dioxide gas laser | 270 | 100 | B |
| Example B2 | B2 | 1.33 | 78 | Carbon dioxide gas laser | 270 | 100 | C |
| Example B3 | B3 | 1.32 | 75 | Carbon dioxide gas laser | 240 | 100 | C |
| Example B4 | B4 | 1.22 | 72 | Carbon dioxide gas laser | 235 | 92 | C |
| Example B5 | B5 | 1.28 | 72 | Carbon dioxide gas laser | 220 | 90 | C |
| Example B6 | B6 | 1.24 | 77 | Carbon dioxide gas laser | 225 | 86 | C |
| Example B7 | B7 | 1.35 | 74 | Carbon dioxide gas laser | 210 | 65 | C |
| Example B8 | B8 | 1.42 | 81 | Carbon dioxide gas laser | 295 | 100 | C |
| Example B9 | B9 | 1.36 | 79 | Carbon dioxide gas laser | 270 | 100 | B |

TABLE 4-continued

|  | Relief printing plate | Relief layer | | Laser used for engraving | Engraving depth (μm) | Survival rate after immersion in UV ink (% by mass) | Rinsing property |
|---|---|---|---|---|---|---|---|
|  |  | Thickness (mm) | Shore A hardness (°) |  |  |  |  |
| Example B10 | B10 | 1.51 | 84 | Carbon dioxide gas laser | 245 | 100 | C |
| Example B11 | B11 | 1.43 | 71 | Carbon dioxide gas laser | 210 | 100 | C |
| Example B12 | B12 | 1.19 | 75 | Carbon dioxide gas laser | 220 | 100 | B |
| Example B13 | B13 | 1.23 | 81 | Carbon dioxide gas laser | 245 | 100 | B |
| Example B14 | B14 | 1.41 | 78 | Carbon dioxide gas laser | 220 | 100 | C |
| Example B15 | B15 | 1.54 | 73 | Carbon dioxide gas laser | 235 | 100 | C |
| Example B16 | B16 | 1.38 | 81 | Carbon dioxide gas laser | 270 | 100 | C |
| Example B17 | B17 | 1.33 | 78 | Carbon dioxide gas laser | 270 | 100 | C |
| Example B18 | B18 | 1.36 | 74 | Carbon dioxide gas laser | 265 | 100 | C |
| Example B19 | B19 | 1.29 | 81 | Carbon dioxide gas laser | 255 | 100 | C |
| Example B20 | B20 | 1.25 | 79 | Carbon dioxide gas laser | 255 | 100 | C |
| Example B21 | B21 | 1.32 | 74 | Carbon dioxide gas laser | 265 | 100 | B |
| Example B22 | B22 | 1.29 | 71 | Carbon dioxide gas laser | 270 | 100 | B |
| Example B23 | B23 | 1.25 | 75 | Carbon dioxide gas laser | 300 | 100 | B |
| Example B24 | B24 | 1.33 | 78 | Carbon dioxide gas laser | 305 | 100 | C |
| Example B25 | B25 | 1.32 | 75 | Carbon dioxide gas laser | 255 | 100 | B |
| Example B26 | B26 | 1.22 | 72 | Carbon dioxide gas laser | 265 | 100 | B |
| Example B27 | B27 | 1.42 | 81 | Carbon dioxide gas laser | 260 | 100 | B |
| Comparative Example B1 | BC1 | 1.36 | 76 | Carbon dioxide gas laser | 180 | 100 | C |
| Comparative Example B2 | BC2 | 1.45 | 79 | Carbon dioxide gas laser | 170 | 100 | C |
| Comparative Example B3 | BC3 | 1.33 | 73 | Carbon dioxide gas laser | 180 | 100 | D |
| Comparative Example B4 | BC4 | 1.31 | 71 | Carbon dioxide gas laser | 165 | 100 | D |
| Comparative Example B5 | BC5 | 1.29 | 81 | Carbon dioxide gas laser | 160 | 92 | D |
| Comparative Example B6 | BC6 | 1.36 | 75 | Carbon dioxide gas laser | 150 | 90 | D |
| Comparative Example B7 | BC7 | 1.27 | 77 | Carbon dioxide gas laser | 155 | 86 | D |
| Comparative Example B8 | BC8 | 1.45 | 79 | Carbon dioxide gas laser | 145 | 65 | D |

TABLE 5

|  | Relief printing plate | Relief layer | | Laser used for engraving | Engraving depth (μm) | Survival rate after immersion in UV ink (% by mass) | Rinsing property |
|---|---|---|---|---|---|---|---|
|  |  | Thickness (mm) | Shore A hardness (°) |  |  |  |  |
| Example B28 | B28 | 1.31 | 70 | Carbon dioxide gas laser | 215 | 100 | B |
| Example B29 | B29 | 1.35 | 73 | Carbon dioxide gas laser | 215 | 100 | A |
| Example B30 | B30 | 1.15 | 68 | Carbon dioxide gas laser | 225 | 100 | A |
| Example B31 | B31 | 1.28 | 79 | Carbon dioxide gas laser | 295 | 100 | A |
| Example B32 | B32 | 1.19 | 80 | Carbon dioxide gas laser | 220 | 100 | B |
| Example B33 | B33 | 1.25 | 76 | Carbon dioxide gas laser | 265 | 100 | B |
| Example B34 | B34 | 1.29 | 73 | Carbon dioxide gas laser | 260 | 100 | A |
| Example B35 | B35 | 1.15 | 81 | Carbon dioxide gas laser | 245 | 100 | A |
| Example B36 | B36 | 1.22 | 81 | Carbon dioxide gas laser | 230 | 100 | B |
| Example B37 | B37 | 1.29 | 76 | Carbon dioxide gas laser | 235 | 100 | B |
| Example B38 | B38 | 1.24 | 79 | Carbon dioxide gas laser | 220 | 100 | B |
| Example B39 | B39 | 1.31 | 71 | Carbon dioxide gas laser | 245 | 100 | A |
| Example B40 | B40 | 1.33 | 71 | Carbon dioxide gas laser | 225 | 100 | A |
| Example B41 | B41 | 1.18 | 70 | Carbon dioxide gas laser | 235 | 100 | A |
| Example B42 | B42 | 1.29 | 77 | Carbon dioxide gas laser | 300 | 100 | A |
| Example B43 | B43 | 1.18 | 82 | Carbon dioxide gas laser | 230 | 100 | B |
| Example B44 | B44 | 1.21 | 79 | Carbon dioxide gas laser | 275 | 100 | B |
| Example B45 | B45 | 1.31 | 71 | Carbon dioxide gas laser | 270 | 100 | A |
| Example B46 | B46 | 1.14 | 83 | Carbon dioxide gas laser | 255 | 100 | A |
| Example B47 | B47 | 1.26 | 79 | Carbon dioxide gas laser | 240 | 100 | B |
| Example B48 | B48 | 1.31 | 78 | Carbon dioxide gas laser | 245 | 100 | B |
| Example B49 | B49 | 1.21 | 81 | Carbon dioxide gas laser | 230 | 100 | B |

Tables 2 to 5 show that the relief printing plates of the Examples are, as compared with the Comparative Examples, have a large engraving depth and no problems on rinsing property. From this result of the engraving depth, the resin compositions for laser engraving prepared in the Examples are confirmed to have a high engraving sensitivity.

Further, Tables 2 to 5 clearly show that the resistance to UV inks is considerably enhanced by using a polymer that is soluble in water or ethanol in the Examples and Comparative Examples.

Note that, regarding the thickness, shore A hardness, and rinsing property of the relief layers, the two kinds of lasers used for engraving provide similar evaluation results.

All publications, patent applications, and technical standards mentioned in this specification are herein incorporated by reference to the same extent as if each individual publication, patent application, or technical standard was specifically and individually indicated to be incorporated by reference.

What is claimed is:

1. A relief printing plate precursor for laser engraving comprising a support, and a relief forming layer comprising a resin composition for laser engraving, the resin composition comprising:
    (A) a binder polymer; and
    (B) a metal compound containing a metal selected from the group consisting of metals in Group 1 to Group 15 in the periodic table,
    wherein the (B) metal compound is at least one selected from the group consisting of a sulfide, a halide, a carboxylate, a sulfonate, a nitrate, a sulfate, an alkoxide, a hydroxide, and an acetylacetonate complex, and
    wherein a thickness of the relief forming layer is from 0.05 mm to 10 mm.

2. The relief printing plate precursor for laser engraving according to claim 1, wherein the (A) binder polymer is at least one selected from the group consisting of a vinyl polymer, a polyamide, a polyurethane, and a polyurea.

3. The relief printing plate precursor for laser engraving according to claim 1, wherein the (A) binder polymer is a vinyl polymer.

4. The relief printing plate precursor for laser engraving according to claim 1, wherein the (A) binder polymer is a vinyl polymer and is soluble in water, ethanol or a combination thereof.

5. The relief printing plate precursor for laser engraving according to claim 1, wherein the (B) metal compound contains at least one metal selected from the group consisting of metals in Group 1, Group 2, Group 4, Group 12, Group 13, Group 14, and Group 15 in the periodic table.

6. The relief printing plate precursor for laser engraving according to claim 1, wherein the (B) metal compound contains at least one metal selected from the group consisting of Na, K, Ca, Mg, Ti, Zr, Al, Zn, Sn, and Bi.

7. The relief printing plate precursor for laser engraving according to claim 1, wherein the (B) metal compound is at least one selected from the group consisting of a halide, a carboxylate, a nitrate, a sulfate, a hydroxide, and an acetylacetonate complex.

8. The relief printing plate precursor for laser engraving according to claim 1, wherein
    the (B) metal compound contains at least one metal selected from the group consisting of metals in Group 1, Group 2, Group 4, Group 12, Group 13, Group 14, and Group 15 in the periodic table, and
    the (B) metal compound is a halide, carboxylate, nitrate, sulfate, hydroxide, or acetylacetonate complex of the at least one metal.

9. The relief printing plate precursor for laser engraving according to claim 1, wherein
    the (B) metal compound contains at least one metal selected from the group consisting of Na, K, Ca, Mg, Ti, Zr, Al, Zn, Sn, and Bi, and
    the (B) metal compound is a halide, carboxylate, nitrate, sulfate, hydroxide, or acetylacetonate complex of the at least one metal.

10. The relief printing plate precursor for laser engraving according to claim 1, wherein the resin composition is curable by at least light or heat.

11. The relief printing plate precursor for laser engraving according to claim 1, wherein the resin composition is curable by heat.

12. A method of producing a relief printing plate, comprising:
    crosslinking a relief forming layer in a relief printing plate precursor for laser engraving by at least light or heat, the relief forming layer comprising a resin composition, the resin composition comprising (A) a binder polymer, and (B) a metal compound containing a metal selected from the group consisting of metals in Group 1 to Group 15 in the periodic table and being at least one selected from the group consisting of a sulfide, a halide, a carboxylate, a sulfonate, a nitrate, a sulfate, an alkoxide, a hydroxide, and an acetylacetonate complex; and
    laser engraving the crosslinked relief forming layer to form a relief layer.

13. The method of producing a relief printing plate according to claim 12, wherein the crosslinking is crosslinking of the relief forming layer by heat.

14. A relief printing plate comprising a relief layer, which is produced by the method of producing a relief printing plate according to claim 12.

15. The relief printing plate according to claim 14, wherein the shore A hardness of the relief layer is from 50° to 90°.

16. The relief printing plate precursor for laser engraving according to claim 1, wherein the acetylacetonate complex has a substituent group.

17. The method of producing a relief printing plate according to claim 12, wherein the (A) binder polymer is at least one selected from the group consisting of a vinyl polymer, a polyamide, a polyurethane, and a polyurea.

18. The method of producing a relief printing plate according to claim 12, wherein the (B) metal compound contains at least one metal selected from the group consisting of metals in Group 1, Group 2, Group 4, Group 12, Group 13, Group 14, and Group 15 in the periodic table.

19. The method of producing a relief printing plate according to claim 12, wherein the (B) metal compound contains at least one metal selected from the group consisting of Na, K, Ca, Mg, Ti, Zr, Al, Zn, Sn, and Bi.

20. The method of producing a relief printing plate according to claim 12, wherein the (B) metal compound is at least one selected from the group consisting of a halide, a carboxylate, a nitrate, a sulfate, a hydroxide, and an acetylacetonate complex.

* * * * *